United States Patent
Hsu et al.

(10) Patent No.: US 8,917,661 B2
(45) Date of Patent: Dec. 23, 2014

(54) APPARATUSES AND METHODS FOR ENHANCING DATA RATE FOR PACKET-SWITCHED (PS) DATA SERVICE

(75) Inventors: Ming-Wan Hsu, Taipei (TW); Hsiao-Ju Kuo, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 383 days.

(21) Appl. No.: 13/228,214

(22) Filed: Sep. 8, 2011

(65) Prior Publication Data

US 2013/0064176 A1 Mar. 14, 2013

(51) Int. Cl.
| | |
|---|---|
| *H04W 4/00* | (2009.01) |
| *H04W 4/02* | (2009.01) |
| *H04W 36/00* | (2009.01) |
| *H04W 48/16* | (2009.01) |
| *H04W 48/18* | (2009.01) |
| *H04W 88/06* | (2009.01) |

(52) U.S. Cl.
CPC ............ *H04W 4/02* (2013.01); *H04W 36/0083* (2013.01); *H04W 48/16* (2013.01); *H04W 48/18* (2013.01); *H04W 88/06* (2013.01)
USPC .......................................... 370/328; 370/329

(58) Field of Classification Search
USPC ......................................................... 370/328
See application file for complete search history.

(56) References Cited

U.S. PATENT DOCUMENTS

| | | | |
|---|---|---|---|
| 2010/0075716 A1 | 3/2010 | Chang et al. | |
| 2010/0304782 A1* | 12/2010 | Chang et al. | 455/552.1 |
| 2011/0070869 A1* | 3/2011 | Ryu | 455/412.1 |
| 2011/0077003 A1 | 3/2011 | Shin | |

FOREIGN PATENT DOCUMENTS

| | | |
|---|---|---|
| CN | 101184290 | 5/2008 |
| CN | 101686575 | 3/2010 |
| CN | 102036350 | 4/2011 |

OTHER PUBLICATIONS

English language translation (machine translation) of CN 101184290 (published May 21, 2008).

* cited by examiner

*Primary Examiner* — Yemane Mesfin
*Assistant Examiner* — Jeff Banthrongsack
(74) *Attorney, Agent, or Firm* — McClure, Qualey & Rodack, LLP

(57) ABSTRACT

A wireless communication device for enhancing a data rate for a packet-switched (PS) data service is provided. The device comprises a processor configured to reference cell information corresponding to a first subscriber identity card to maintain mobility for a second subscriber identity card by using the referenced cell information when performing the PS data service with a first service network for the first subscriber identity card.

30 Claims, 19 Drawing Sheets

APPARATUSES AND METHODS FOR ENHANCING DATA RATE FOR PACKET-SWITCHED (PS) DATA SERVICE

BACKGROUND OF THE INVENTION

1. Field of the Invention

The invention generally relates to methods and apparatuses for enhancing the data rate for a packet-switched data service, and more particularly, for enhancing the data rate for the packet-switched data service with a first subscriber identity card while a second subscriber identity card is performing a scheduled measurement to maintain mobility or receive network messages.

2. Description of the Related Art

With growing demand for ubiquitous computing and networking, various wireless communication technologies have been developed, such as the Global System for Mobile communications (GSM) technology, General Packet Radio Service (GPRS) technology, Enhanced Data rates for Global Evolution (EDGE) technology, Universal Mobile Telecommunications System (UMTS) technology, Wideband Code Division Multiple Access (W-CDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, and others. Generally, a cellular phone only supports one wireless communication technology and provides a user the flexibility of mobile communications at all times via the supported wireless communication technology, regardless of his/her geographic location. Specifically in today's business world, a cellular phone is becoming a necessary business tool for conducting business conveniently. For business people, having an additional cellular phone exclusive for business matters is a common choice, since they need to conduct business while being out of the office or even out of the city/country. Others may find having an additional cellular phone as a good way to save/control the budget for wireless service charges (including phone services and/or data services). However, having two or more than two cellular phones may be troublesome when one has to switch frequently between the cellular phones and carry around all the cellular phones with himself/herself. In order to provide a convenient way of having multiple subscriber numbers, dual-card or multiple-card cellular phones have been developed, which generally have two or more wireless communication modules for respectively performing wireless transmission and reception with an individual subscriber number. The dual-card or multiple-card design allows the wireless communication modules to be active simultaneously and allows calls to be received on either subscriber numbers associated with one of the wireless communication modules at any time. Thus, a dual-card or multiple-card cellular phone may be used for business and personal use with separate subscriber numbers and bills, or for travel with the second subscriber number for the country visited.

For the dual-card or the multiple-card cellular phones with one single transceiver, only one wireless communication module is allowed to obtain network resources using the single transceiver, while another wireless communication module has no control over the single transceiver. Specifically, the wireless communication module with no control over the single transceiver is not aware that the single transceiver is occupied by another wireless communication module, because the two or more wireless communication modules operate independently and lack a proper communication mechanism therebetween. For example, a dual-card cellular phone may be configured such that the single transceiver is occupied by the first wireless communication module for performing a PS data service, e.g. the Multimedia Messaging Service (MMS). While the dual-card cellular phone is performing the PS data service with the first wireless communication module, a second wireless communication module may constantly interrupt the PS data service in order to gain the control of the single transceiver for performing radio measurements which allows the second communication module to maintain mobility or receive network messages, such as a paging message. As a result, the PS data rate or data throughput of the PS data service may be damaged.

Therefore, it is desirable to have a flexible way of managing the operations between the multiple wireless communication modules for multiple subscriber identity cards, so that the operations of the multiple wireless communication modules may be coordinated to maximize or enhance the PS data rate while maintaining the mobility for the idle subscriber cards.

BRIEF SUMMARY OF THE INVENTION

Accordingly, embodiments of the invention provide apparatuses and methods to enhance data rate for a PS data service. In one aspect of the invention, a wireless communication device for enhancing a data rate for a packet-switched (PS) data service is provided. The device comprises a processor configured to reference cell information corresponding to a first subscriber identity card to maintain mobility for a second subscriber identity card by using the referenced cell information when performing the PS data service with a first service network for the first subscriber identity card.

In another aspect of the invention, a wireless communication device for enhancing a data rate for a packet-switched (PS) data service is provided. The device comprises a processor configured to disable an inter-RAT (Radio Access Technology) measurement for a second subscriber identity card when performing the PS data service with a first subscriber identity card.

In another aspect of the invention, a wireless communication method for enhancing a data rate for a packet-switched (PS) data service is provided. The method comprises: referencing cell information corresponding to a first subscriber identity card; and maintaining mobility for a second subscriber identity card by using the referenced cell information when performing the PS service with the first subscriber identity card.

In another aspect of the invention, a wireless communication method for enhancing a data rate for a packet-switched (PS) data service is provided. The method comprises: disabling an inter-RAT (Radio Access Technology) measurement of the second subscriber identity card when performing the PS data service with a first subscriber identity card.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
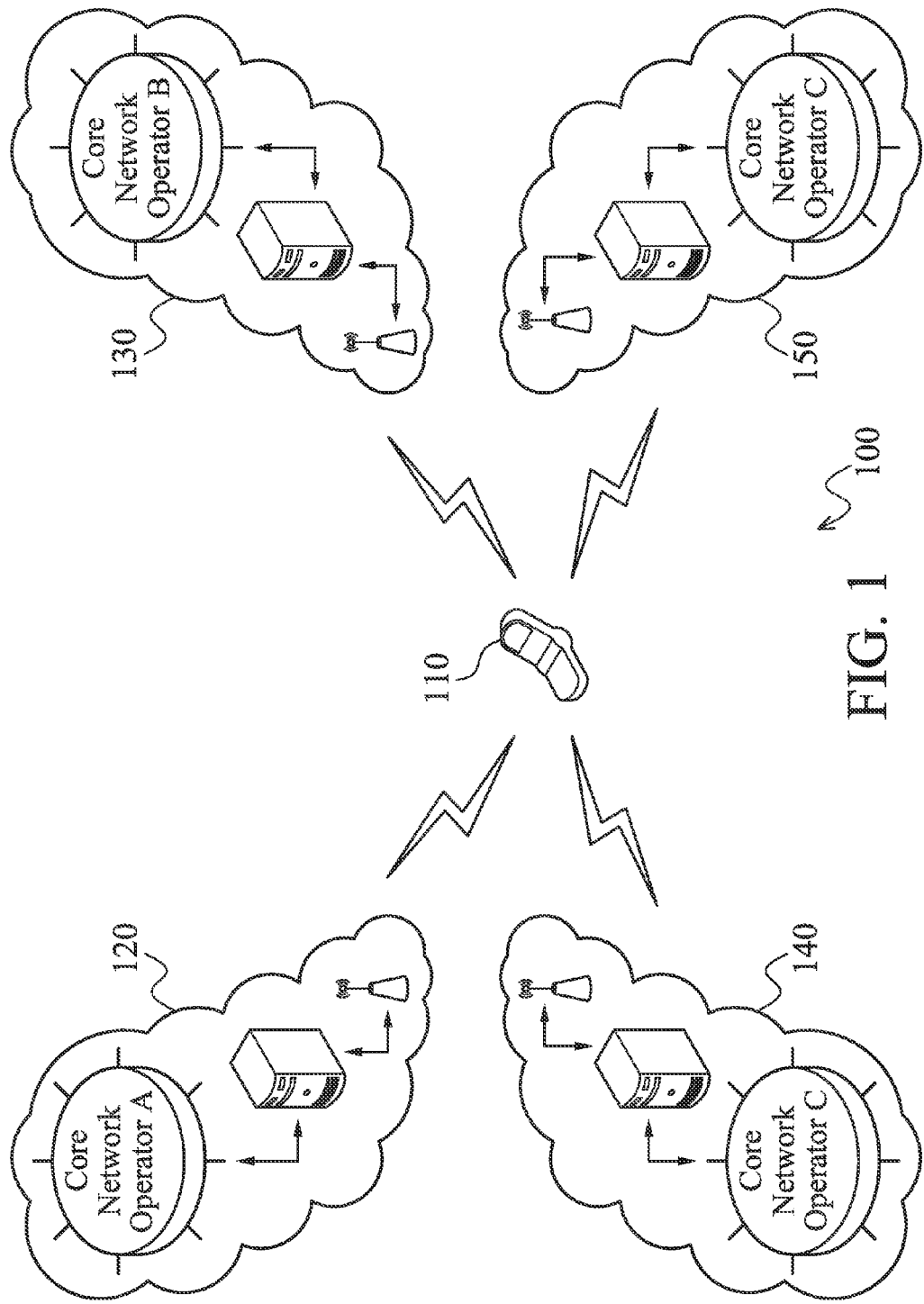
FIG. 1 is a block diagram of a wireless communications environment according to an embodiment of the invention.

FIG. 1 is a block diagram of a wireless communications environment according to an embodiment of the invention. The wireless communications environment 100 comprises a mobile station (MS) 110, and service networks 120, 130, 140 and 150. The MS 110 may wirelessly communicate with the service networks 120, 130, 140 and 150 with one to four separate subscriber numbers and/or four separate subscriber identities, after camping on one to four cells. The cell may be managed by a node-B, a base station (BS), an advanced BS (ABS), an enhanced BS (EBS) or others. However, the communication is only allowed to be performed with one of the four service networks 120, 130, 140 and 150 at a given time. The service networks 120, 130, 140 and 150 may be in compliance with any of the GSM/GPRS/EDGE, WCDMA, CDMA 2000, UMTS, TD-SCDMA, WiMAX, LTE, LTE-A, and TD-LTE technologies. The service networks 120, 130, 140 and 150 may be operated by different or the same operator using the same or different Radio Access Technologies (RATs). For example: the service network 120 and 130 may be operated by different operators of the core network operator A and core network operator B, while both the service networks 140 and 150 may be operated by the same core network operator C. The MS 110 may be equipped with two single RAT subscriber identity cards and one dual RAT subscriber identity card or alternatively, the MS 110 may be equipped with two dual RAT subscriber identity cards or four single RAT subscriber identity cards, wherein the invention is not limited thereto. The single RAT subscriber identity cards may be used to communicate wirelessly with one service network respectively, such as the service network 120 or 130, while the dual RAT subscriber identity card may be used to communicate wirelessly with the more than one service network, such as the service network 140 and 150 The dual RAT subscriber identity card may be configured to communicate with the service networks 140 and 150 at the same time or only communicate with one of the service networks 140 and 150 at a time, depending on the type of implementation. The subscriber numbers may be provided by three separate subscriber identity cards in compliance with the specifications of the technologies employed by the service networks 120, 130, 140 and 150. For example, the service network 120 may be a GSM/GPRS/EDGE system, and correspondingly, one of the single RAT subscriber identity cards may be a Subscriber Identity Module (SIM) card, while the service network 130 may be a TD-SCDMA system and correspondingly, the other one of the single RAT subscriber identity cards may be a CDMA subscriber Identity Module (CSIM) card. The service network 140 may be a GSM/GPRS/EDGE system while the service network 150 may be a UMTS system and correspondingly, the dual RAT subscriber identity cards may be a Universal SIM (USIM) card that supports the GSM/GPRS/EDGE RAT and the UMTS RAT. The three subscriber identity cards equipped by the MS 110 may be taken as an example. The MS 110 may also be equipped with 2, 3, or more subscriber identity cards and be adapted to 2, 3, or more wireless telecommunication technologies according to different design requirements of the MS 110.

The MS 110 wirelessly accesses the Internet resources, such as e-mail transmissions, Web browsing, file upload/download, instant messaging, streaming video, voice over IP (VoIP) or others, or makes a wireless phone call. In addition, a computer host or a notebook may be connected/coupled to the MS 110 and wirelessly access Internet resources therethrough. The MS 110 may be operated in an idle mode or dedicated mode in GSM systems for the inserted SIM card. In an idle mode, the MS searches for or measures a Broadcast Control Channel (BCCH) with a better signal quality from a cell provided by a specific service network, or is synchronized to the BCCH of a specific cell, wherein it is continuously ready to perform a random access procedure on a Random Access Channel (RACH) for requesting for a dedicated channel. In the dedicated mode, the MS 110 occupies a physical channel and tries to synchronize therewith, and establishes logical channels and performs switching therethrough. As the MS 110 is equipped with one or more subscriber identity cards, the MS 110 may be operated in an idle mode and connected mode, for a WCDMA or TD-SCDMA network, for each inserted USIM card.

The MS may perform power measurements to candidate cells and use the measured signal quality and/or signal strength as an input for handover and cell reselection decisions. In the case where the MS is in the idle mode, the list of the neighboring GSM cell Broadcast Control Channel (BCCH) frequencies may be transmitted with its own BCCH frequency and the MS may listen for the BCCH frequencies and perform a power measurement for the GSM Received Signal Strength Indication (RSSI) of the BCCH, which is a wideband received power within the GSM channel bandwidth. In the case of a UMTS or WCDMA network, although the same wideband frequency is used by adjacent cells, the cells are physically identified by their different scrambling codes, and the MS may constantly monitor the Common Pilot Channel (CPICH) for power levels (e.g. Energy over Noise Ratio (Ec/No), Received Signal Code Power (RSCP), and so on). The information may then be used to assess whether the UMTS/WCDMA cell should be added to the ranking candidates for cell reselection. The MS may make a cell reselection decision depending on different cell reselection criteria corresponding to each radio access technology (RAT). For example, for a GSM network, the cell reselection criteria may be based on the C1 and C2 criterions. Alternatively, for a UMTS network or a WCDMA network, there may be other cell reselection criteria such as an R-criterion. The MS may check for the Location Area Identity (LAI) from the system information message present on the BCCH, the broadcast channel (BCH), or others, after a cell reselection is performed, wherein the LAI represents a unique identity for different Location Area (LA). When the new cell and the old cell belong to different LAs, an LA update may be required.

LA update is a procedure that makes the network aware of the MS location. This is a prerequisite for mobility where the MS movement can be tracked and its position known in the case of incoming MT calls, MT short message services (MT SMS) or others. Generally, the wireless network architecture for any of the GSM/GPRS/EDGE, WCDMA, CDMA 2000, WiMAX, TD-SCDMA, LTE, LTE-A, TD-LTE, or other technologies embraces the challenge of supporting such functions as paging, location updating and connection handover/reselection. The handover/reselection mechanism guarantees that whenever the mobile is moving from one base station area/cell to another, the radio connection is handed over or reselected to the target base station without interruption. The location update procedure, alternatively, enables the network of the supported RAT to keep track of the subscriber camping within the coverage of the network, while a paging message is used to reach the MS to which a call is destined (e.g. MT call, MT SMS or others). Each LA is uniquely identified with a Location Area Identity (LAI) and the LAI consists of a Mobile Country Code (MCC)+Mobile Network Code (MNC)+LA code (LAC).

Figure 2:
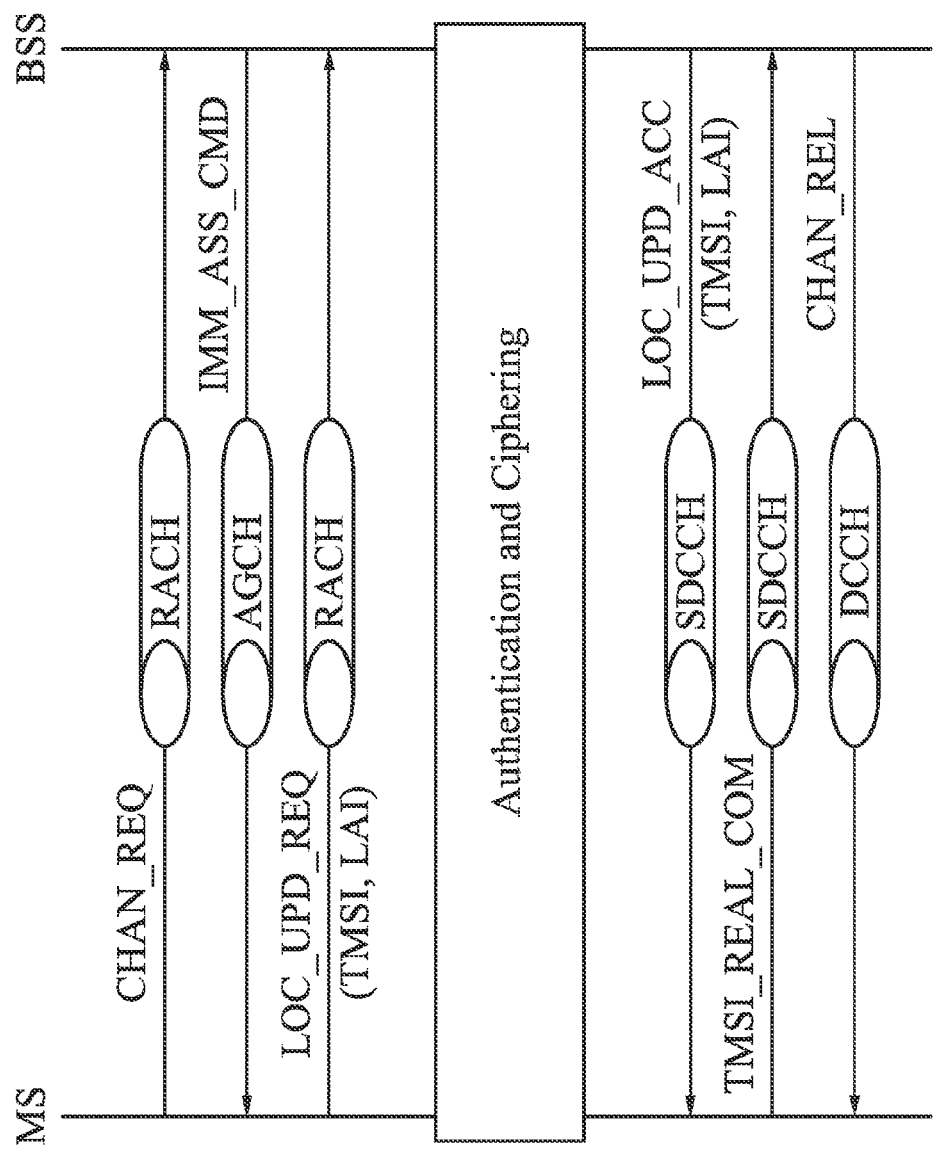
FIG. 2 is a diagram illustrating an exemplary LA update procedure for a GSM network.

FIG. 2 is a diagram illustrating an exemplary LA update procedure for a GSM network. In a GSM LA update procedure, the MS may firstly request for a channel by sending a Channel Request (CHAN_REQ) message on the RACH, the BSS may respond by sending an Immediate Assignment Command message (IMMASS_CMD) on the AGCH. Then, the MS may switch to the assigned SDCCH and reply to the BSS with a Location Update Request (LOC_UPD_REQ). Included in the LOC_UPD_REQ is the TMSI that the MS is currently using as well as the Location Area Identifier (LAI) of the Visitor Location Register (VLR) it is leaving, and the BTS may acknowledge receipt of the message (not shown) to the BSS. An authentication procedure is then carried out. In the case where the authentication is unsuccessful, the procedure is aborted. In the case where the authentication is successful, the ciphering procedure is performed.

Before the network provides any services to the MS, the network requires the MS to authenticate itself. During the authentication and ciphering process, the BSS sends an Authentication Request (AUTH_REQ) message including a random number (RAND) to the MS, the RAND is a 128-bit random challenge generated by the Home Location Register (HLR) for authentication. The MS calculates a proper signed response (SRES) based on the RAND that was given and sends the SRES to the BSS in an Authentication Response (AUTH_RESP) message. The BSS verifies the SRES. If the SRES is correct then the MS is authenticated and allowed to access the network. Once the MSCNLR has authenticated the MS, the MSC/VLR may order the BSS and MS to switch to a cipher mode using the CIPH_MOD_CMD message. Once the MS in cipher mode, the VLR will normally assign a new TMSI to the MS. Once the MS is authenticated and in the cipher mode, the MSC/VLR may send a Location Update Accept message (LOC_UPD_ACC) through the BSS to the MS. The LOC_UPD_ACC may have a TMSI assignment in it. The MS may then respond to the BSS with a TMSI Reallocation Complete message (TMSI_REAL_COM) indicating that it has received the TMSI. The BSS then sends the MS a Channel Release message (CHAN_REL) instructing it to go into idle mode. The BSS then un-assigns the SDCCH. As far as the MS is concerned, the location update has been completed. The LA update procedure in WCDMA, TD-SCDMA or UMTS systems is similar to that of the GSM systems and is omitted herein.

Figure 3:
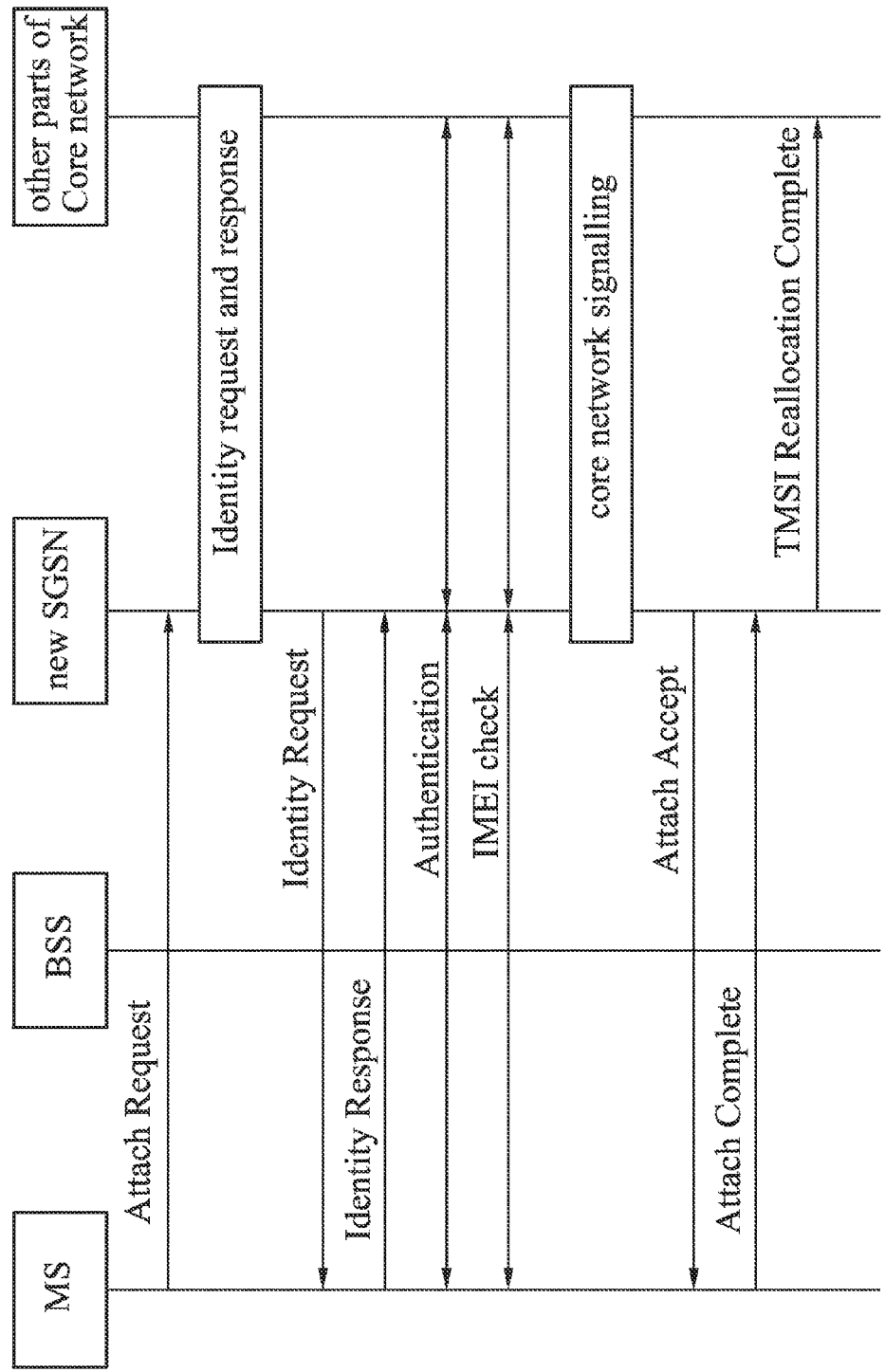
FIG. 3 is a simplified diagram illustrating a combined GPRS/IMSI attach procedure.

For the GPRS systems, networks based on the Internet Protocol (IP) (e.g. the global Internet or private/corporate intranets) and X.25 networks are supported. Before one of the (U)SIM cards of an MS can use the GPRS service, the MS needs to perform a GPRS attach procedure to attach to the GPRS network with one (U)SIM card. The GPRS attach procedure is a process during which the mobile device informs the network about its presence in the network. In a GPRS attach procedure, the SGSN establishes a mobility management (MM) context relating to the mobility and security for the MS. FIG. 3 is a simplified diagram illustrating a combined GPRS/IMSI attach procedure. In the combined GPRS/IMSI attach procedure, the MS first sends an Attach Request message to a Serving GPRS Support Node (SGSN), wherein the message sent to the new Serving GPRS Support Node (SGSN) contains the last assigned Packet Temporary Mobile Subscriber Id (P-TMSI) or IMSI, and the location area information, etc. The new SGSN then queries the old SGSN (the previous attached SGSN) for the identity of the MS by exchanging Identity Request and Identity Response messages. Then, the new SGSN requests more information from the MS to authenticate itself by exchanging Identity Request and Identity Response messages. After the MS identity is checked, an authentication similar to the one described in FIG. 2 is performed, wherein the authentication is mandatory if no mobility management (MM) context for the MS exists anywhere in the service network. After authentication, an optional International Mobile Equipment Identity number (IMEI) check may be performed to check the MS equipment. Then, core network signaling takes place, wherein any active PDP context in the new SGSN for the MS is deleted, and signaling exchange takes place between the new SGSN and the Home Location Register (HLR)/Visitor Location Register (VLR) to update the location of the MS. The SGSN selects a Radio Priority SMS, and sends an Attach Accept (which may include P-TMSI, VLR TMSI, P TMSI Signature, Radio Priority SMS, IMS voice over PS Session Supported Indication, or Emergency Service Support indicator) message to the MS. Then, if the P-TMSI or VLR TMSI has been changed, the MS acknowledges the received TMSI(s) by returning an Attach Complete message to the SGSN, and the SGSN confirms the VLR TMSI re-allocation by sending a TMSI Reallocation Complete message to the VLR.

Figure 4:
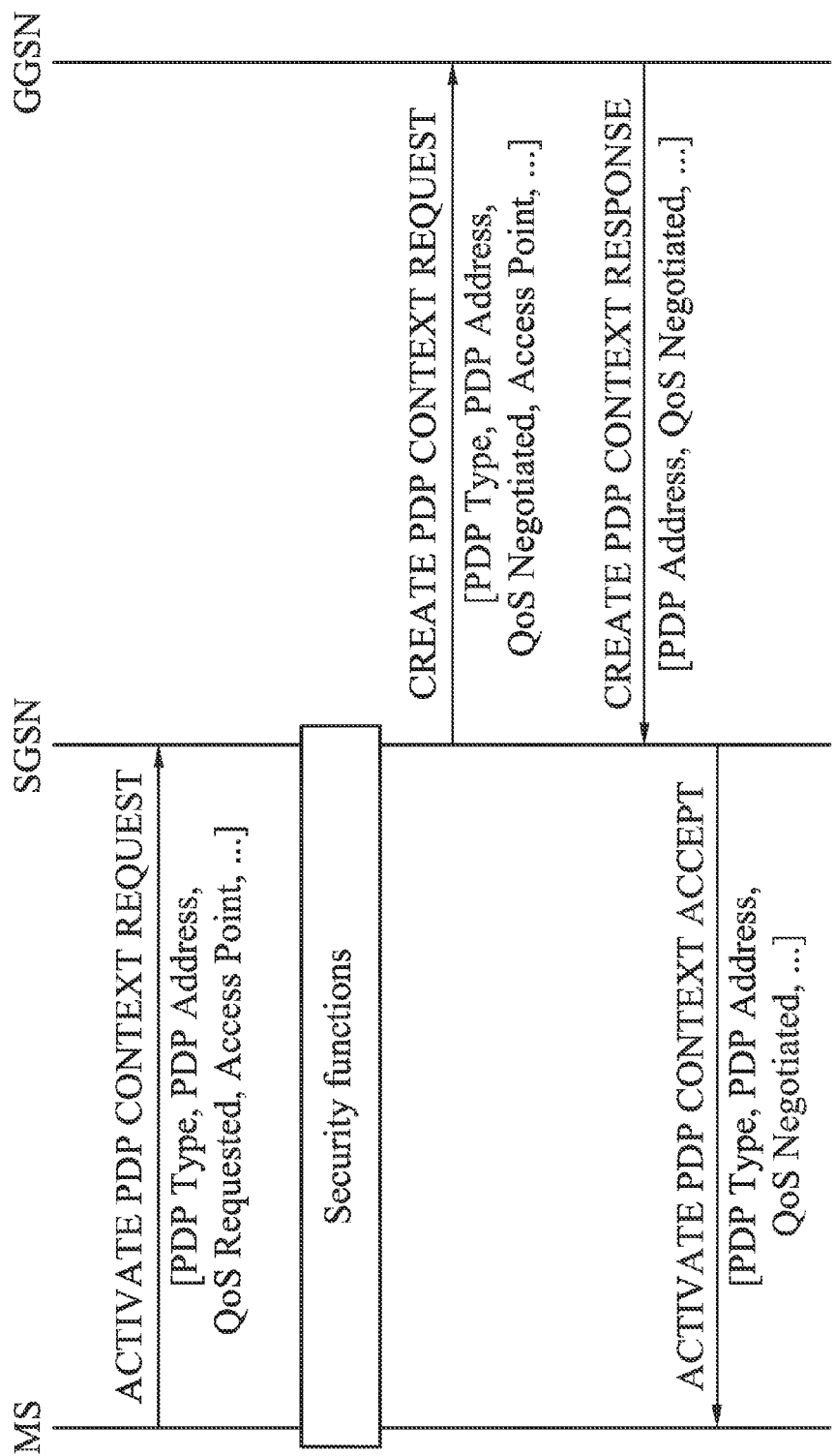
FIG. 4 is a diagram illustrating the PDP context activation procedure initialized by an MS.

To exchange data packets with external Public Data Networks (PDNs) after a successful GPRS attach procedure, the MS applies for an address used in the PDN, wherein the address is called a Packet Data Protocol (PDP) address. In the case where the PDN is an IP network, the PDP address is an IP address. For each session, a so-called PDP context is created, which describes the characteristics of the session. The PDP context describes PDP types (e.g. IPv4, IPv6 or others), wherein the PDP address is assigned to the MS, and the requested Quality of Service (QoS) class and the address of a Gateway GPRS Support Node (GGSN) that serves as the access point to the external network. FIG. 4 is a diagram illustrating the PDP context activation procedure initialized by an MS. With the ACTIVATE PDP CONTEXT REQUEST message, the MS informs the SGSN of the requested PDP context. After that, the typical GSM security functions (e.g. authentication of the MS) are performed. If the access is granted, the SGSN will send a CREATE PDP CONTEXT REQUEST message to the affected GGSN. The GGSN creates a new entry in its PDP context table, which enables the GGSN to route data packets between the SGSN and the external PDN. Next, the GGSN confirms the request to the SGSN with a CREATE PDP CONTEXT RESPONSE message. Finally, the SGSN updates its PDP context table and confirms the activation of the new PDP context to the MS with an ACTIVATE PDP CONTEXT ACCEPT message. Note that for an MS using both CS and PS services, it is possible to perform a combined GPRS/IMSI attach procedure (as illustrated in FIG. 3). The disconnection from the GPRS network is called GPRS detachment, which may be initiated by the MS or by the GPRS network.

In addition, IP packets are transmitted by being encapsulated within the GPRS backbone network. The IP packet transmission is achieved using the GPRS Tunneling Protocol (GTP). That is, GTP packets carry the user's IP packets. The GTP is defined both between GPRS Supports Nodes (GSNs) within the same Public Land Mobile Network (PLMN) and between GSNs of different PLMNs. The GTP contains procedures in the transmission plane as well as in the signaling plane. In the transmission plane, the GTP employs a tunnel mechanism to transfer user data packets. In the signaling plane, the GTP specifies a tunnel control and management protocol. The signaling is used to create, modify, and delete tunnels. A Tunnel Identifier (TID), which is composed of the IMSI of the (U)SIM card and a Network Layer Service Access Point Identifier (NSAPI) uniquely indicates a PDP context. Below the GTP, a transmission control protocol (TCP) is employed to transport the GTP packets within the backbone network. In the network layer, IP is employed to route the packets through the backbone. Taking the GSM systems for example, after the MS successfully attaches to a GPRS network with a (U)SIM card, a cell supporting GPRS may allocate physical channels for the GPRS traffic. In other words, the radio resources of a cell are shared by the MS with the (U)SIM card.

An MS carries out the process of a Public Land Mobile Network (PLMN) search procedure each time the MS is switched on or when the MS is recovering from a state of lack of coverage (e.g. a limited service state). The PLMN search procedure is the process of selecting the best PLMN available. If it is in the home PLMN service area, the MS is programmed to select the home PLMN, wherein the home PLMN is a PLMN where the Mobile Country Code (MCC) and the Mobile Network Code (MNC) of the PLMN identity match the MCC and MNC of any entry in EHPLMN file of the USIM card or the International Mobile Subscriber Identity (IMSI) of the SIM card if EHPLMN does not exist inside of the MS. If the home PLMN is not found, another PLMN from a priority list is selected and a cell belonging to that PLMN is searched.

The MS looks for a suitable cell of the chosen PLMN and chooses that cell to provide available services, and tunes to its control channel. This choosing is known as a "cell selection" or "camping on the cell". The MS will then register its presence in the registration area of the chosen cell if necessary, by means of a location registration (LR), GPRS attach or IMSI attach procedure (as described in FIG. 3). Initial cell selection is the process of the MS finding the best possible cell on a newly selected PLMN in order to receive the system information on the BCCH from the selected PLMN, initiate/receive a call, or receive cell broadcast messages. Two methods of searching for a suitable cell are possible, namely the normal cell selection method and the stored list cell selection method. In the normal cell selection method, the MS looks for a cell which satisfies 5 constraints for a suitable cell by checking cells in a descending order of received signal strength. Specifically, the 5 constraints are listed as follows:

The suitable cell should be a cell of the selected PLMN or, if the selected PLMN is equal to the last registered PLMN, an equivalent PLMN.

The suitable cell should not be "barred".

The suitable cell should not be in an LA which is in the list of "forbidden LAs for roaming"

The radio path loss between MS and base station must be below a threshold set by the PLMN operator.

The suitable cell should not be a Support of Localized Service Area (SoLSA) exclusive cell for which the MS is not subscribed to.

If the MS is unable to find a suitable cell to camp on, or the (U)SIM is not inserted, or if it receives certain responses to an LR request (e.g., "illegal MS"), the MS may attempt to camp on a cell irrespective of the PLMN identity, and enter a "limited service" state in which it can only attempt to make emergency calls. In the case when the MS enters the limited service state due to "No suitable cell". If the MS is unable to obtain normal services from a home PLMN, the MS attempts to camp on an acceptable cell, irrespective of its PLMN identity, so that emergency calls can be made if necessary. Specifically, an "acceptable cell" is a cell on which the UE may camp to obtain limited services (originate emergency calls and receive ETWS if supported). Such a cell shall not be barred and shall fulfill the cell selection criteria. The MS may perform a PLMN search procedure periodically to recover from the limited service state. During the PLMN search procedure, the MS may perform a power scan to find out proper cells to camp on. For the GSM technology, during the power scan, the processor in the GSM/GPRS Baseband chip may instruct the GSM/GPRS RF module to perform signal level measurements on frequencies of the current network. After finding potential candidates based on the received signal level RXL-REV (that is, completion of the power scan), each carrier is investigated by the processor in the GSM/GPRS Baseband chip for the presence of a frequency correction channel (FCCH), beginning with the strongest signal. A FCCH burst (FCB) is an all-zero sequence that produces a fixed tone enabling the GSM/GPRS RF module to lock its local oscillator to the base station clock. Its presence identifies the carrier as a BCCH carrier for synchronization. The MS then uses a synchronization burst (SB) of the synchronization channel (SCH) following the FCCH burst and has a long training sequence to fine tune the frequency correction and time synchronization. The processor in the GSM/GPRS Baseband chip obtains and stores the exact channel configuration of the selected cell from the BCCH data as well as the frequencies of the neighboring cells. After completely collecting and storing information regarding the exact channel configuration and neighboring cells in a memory or a storage device, the GSM/GPRS module performs a location update procedure through a traffic channel (TCH) to inform the cellular network of its location. After the PLMN search procedure is completed, the MS may perform normal circuit switched (CS) or PS operations with the service network it is subscribed to.

Figure 5:
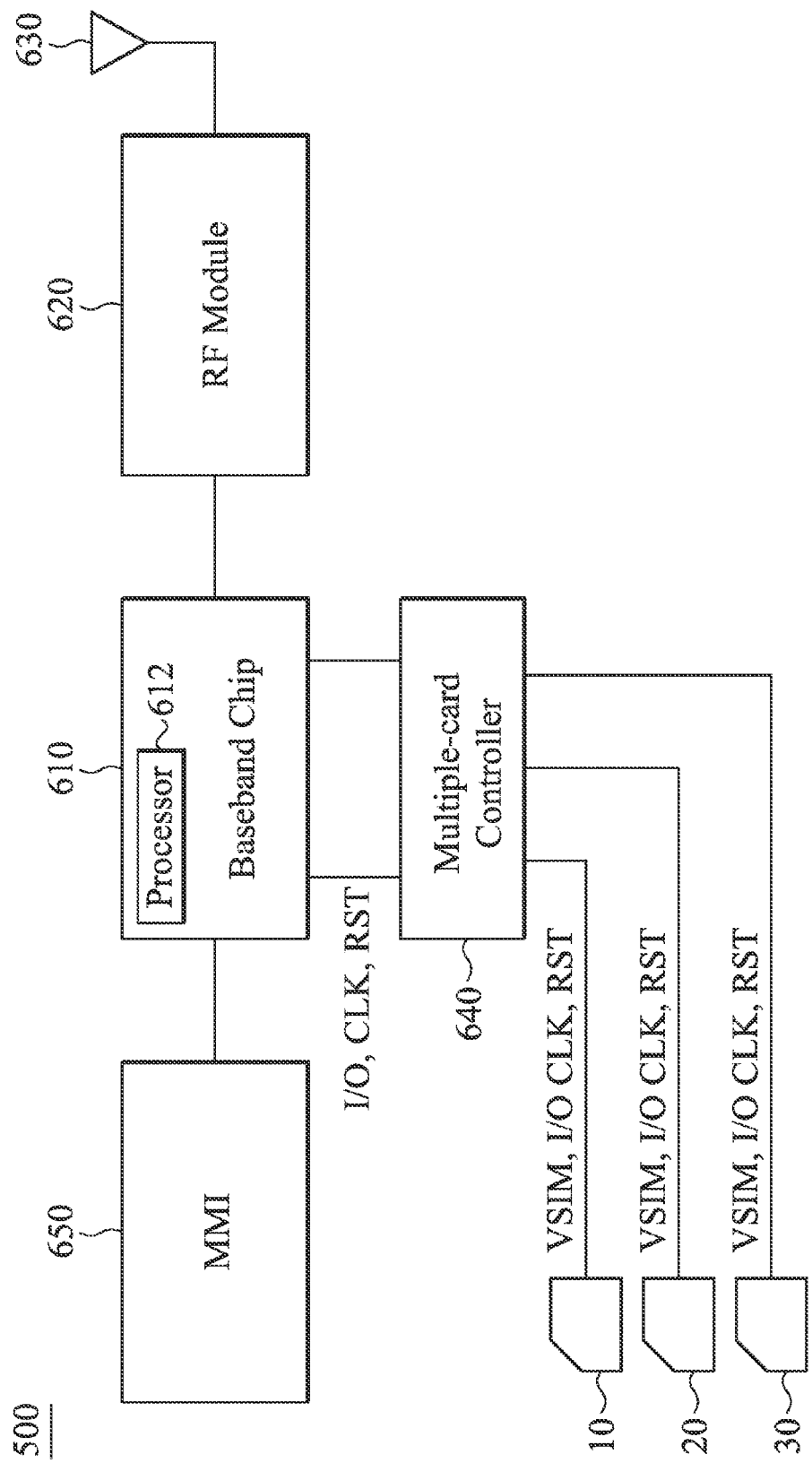
FIG. 5 is a block diagram illustrating the hardware architecture of an MS 500 according to an embodiment of the invention.

FIG. 5 is a block diagram illustrating the hardware architecture of an MS 500 according to an embodiment of the invention. The MS 500 is equipped with a baseband chip 610, and a single RF module 620 coupled with an antenna 630. The baseband chip 610 may contain multiple hardware devices to perform baseband signal processing, including analog to digital conversion (ADC)/digital to analog conversion (DAC), gain adjusting, modulation/demodulation, encoding/decoding, and so on. In particular, the baseband chip 610 may comprise a processor 612. In an embodiment, the processor 612 may be configured to execute instructions stored in a memory device of the MS 600 or other removable memory devices accessible to the processor 612. By executing stored instructions or operating in accordance with hard coded instructions, the processor 612 may control the operation of the MS 500 by directing functionality of the MS 600 associated with enhancing the data rate for a PS data service associated with one of the subscriber identity cards when another subscriber identity card is performing a scheduled measurement to maintain mobility or to receive messages. The processor 612 may also be configured to coordinate operations between different modules of the MS 500, such as the MMI 650, the RF module 620, and the subscriber identity cards 10, 20 and 30. The RF module 620 may receive RF wireless signals from the antenna 630, convert the received RF wireless signals to baseband signals, which are then processed by the baseband chip 610, or receive baseband signals from the baseband chip 610 and convert the received baseband signals to RF wireless signals, which are later transmitted via the antenna 630. The RF module 620 may also contain multiple hardware devices to perform radio frequency conversions. For example, the RF module 620 may comprise a mixer to multiply the baseband signals with a carrier oscillated in the radio frequency of the wireless communications system, wherein the radio frequency may be 900 MHz, 1800 MHz or 1900 MHz utilized in GSM systems, or may be 900 MHz, 1900 MHz or 2100 MHz utilized in the UMTS and WCDMA systems, or others depending on the radio access technology (RAT) in use. As shown in FIG. 5, the subscriber identity cards 10, 20 and 30 are plugged into three sockets of the MS 500. The MS 500 may further comprise a multiple-card controller 640 coupled or connected between the baseband chip 610 and the subscriber identity cards 10, 20 and 30. The multiple-card controller 640 powers the subscriber identity cards 10, 20 and 30 with the same or different voltage levels according to requirements thereof by a power management integrated chip (PMIC) and a battery, wherein the voltage level for each subscriber identity card is determined during initiation. The baseband chip 610 reads data from one of the subscriber identity cards 10, 20 and 30, and writes data to one of the subscriber identity cards 10, 20 and 30 via the multiple-card controller 640. In addition, the multiple-card controller 640 selectively transfers clocks (CLK), resets (RST), and/or input/output data signals (I/O) to the subscriber identity cards 10, 20 and 30 according to instructions issued by the processor 612. The baseband chip 610 may support one or more of the GSM/GPRS/EDGE, UMTS, WCDMA, CDMA 2000, WiMAX, TD-SCDMA, LTE, and TD-LTE technologies. The subscriber identity cards 10, and 30 may be any of the Subscriber Identity Module (SIM) cards, Universal SIM (USIM) cards, Removable User Identity Module (R-UIM), and CDMA Subscriber Identity Module (CSIM) cards, which correspond to the wireless communications technologies supported by the baseband chip 610. Each subscriber identity cards 10, 20 and 30 in the MS 500 may support at least one RAT. For example, the subscriber identity card 10 may be a SIM card, which supports the 2G RAT, such as the GSM/GPRS/EDGE technologies. The subscriber identity card 20 may be a USIM card, which contains the application to support the 2G/3G RATs, such as the GSM/GPRS/EDGE technologies and the UMTS technology. The subscriber identity card 30 may be a CSIM card, which contains the application to support the 2G/3G RATs, such as the GSM/GPRS/EDGE technologies and the CDMA technology. The MMI 650 may include a keyboard, a touch panel, a touch screen, a display device, a joystick, a mouse and/or a scanner, removable memory devices, and so on. The MS 500 may therefore simultaneously camp on as many cells provided by either the same network operator or different network operators for the plugged subscriber identity cards 10, and 30, and operate in different modes such as a connected mode, idle mode, cell Dedicated Channel (CELL_DCH) mode, cell Forward access channel (CELL_FACH) mode, cell Paging Channel (CELL_PCH) mode and UTRAN Registration Area Paging Channel (URA_PCH) mode using the single RF module 620, the baseband chip 610, and the processor 612.

Figure 6:
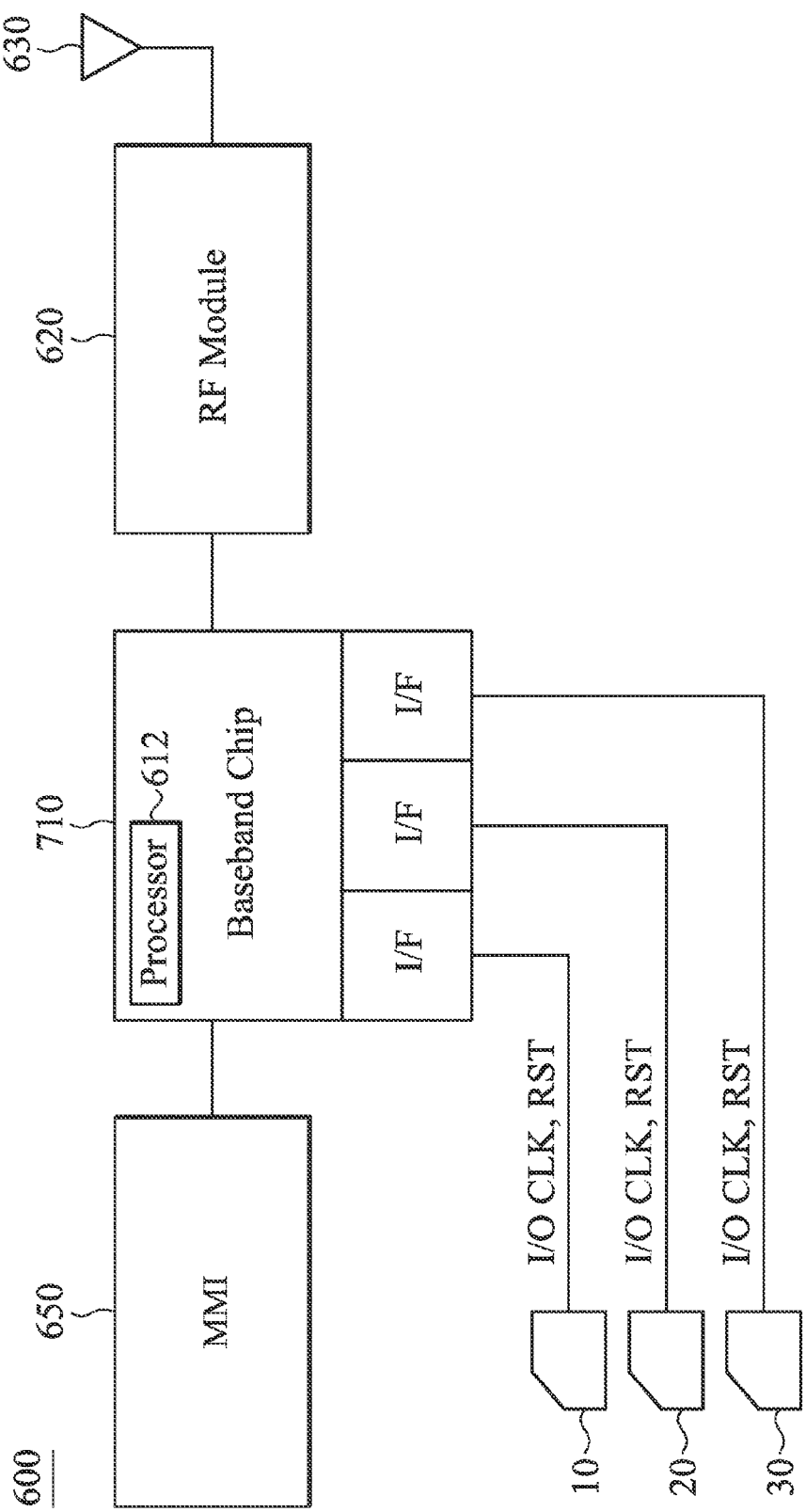
FIG. 6 shows a block diagram illustrating the hardware architecture of an MS 600 according to another embodiment of the invention.

Alternatively, FIG. 6 shows a block diagram illustrating the hardware architecture of an MS 600 according to another embodiment of the invention. Similar to FIG. 5, the baseband chip 710 performs baseband signaling processing, such as analog to ADC/DAC, gain adjusting, modulation/demodulation, encoding/decoding, and so on. The baseband chip 710 may also comprise a processor 612, which controls the operation of the MS 600 by directing functionality of the MS 600 associated with enhancing the data rate for a PS data service associated with one of the subscriber identity cards when another subscriber identity card is performing a scheduled measurement to maintain mobility or to receive messages. And similarly, the MMI 650 may also include various input/output modules. However, the connections from the MS 600 to the subscriber identity cards 10, 20 and 30 are independently handled by three interfaces (I/F) provided from the baseband chip 710, wherein each subscriber identity cards 10, 20 and 30 in the MS 500 may support at least one RAT. It is to be understood that the hardware architecture as shown in FIG.

5 or 6 may be modified to include less than three or more than three subscriber identity cards, and the invention is not limited thereto.

Figure 7:
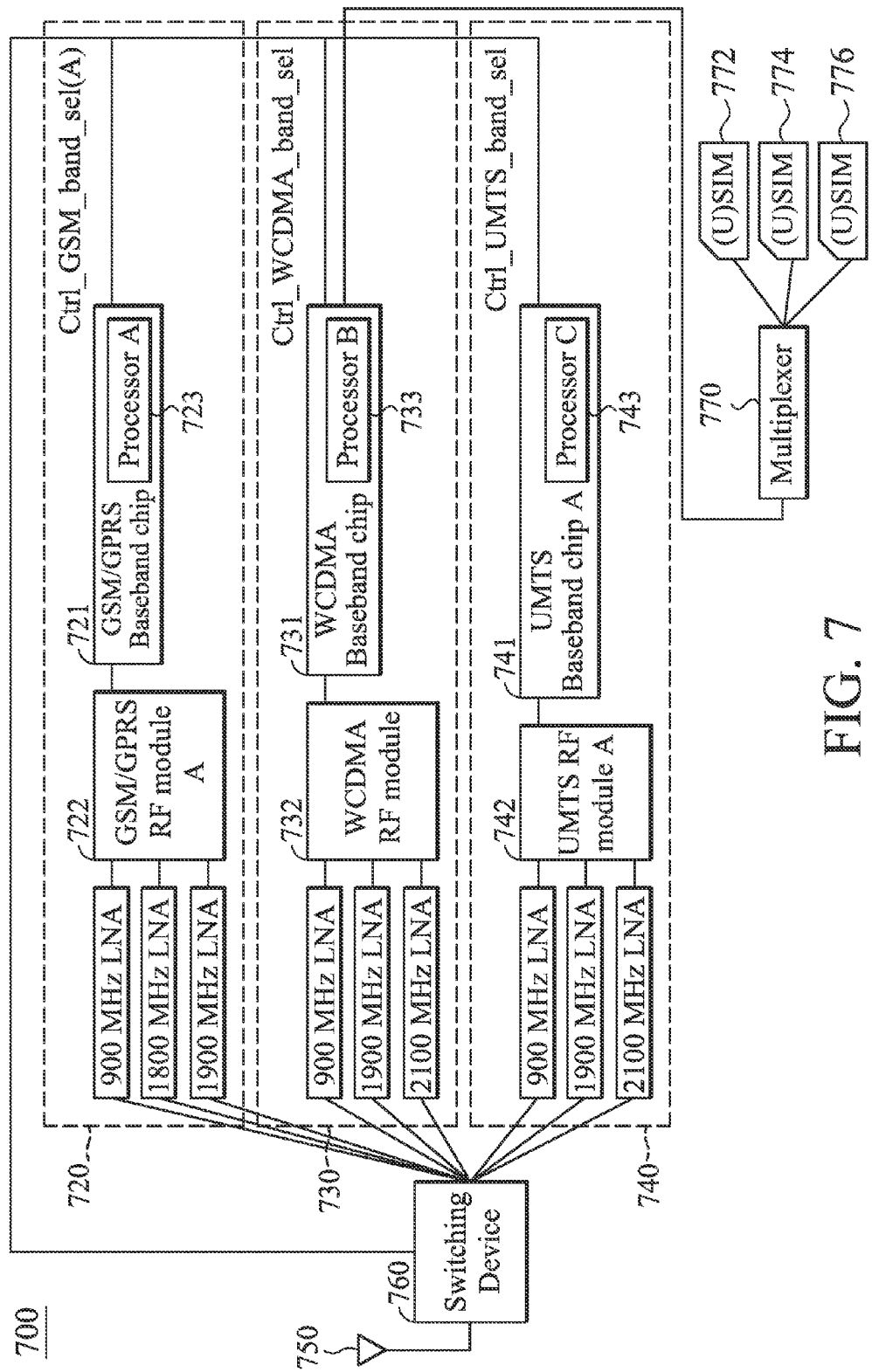
FIG. 7 is a block diagram illustrating the hardware architecture of an MS 700 coupled with three subscriber identity cards and a single antenna according to an embodiment of the invention.

FIG. 7 is a block diagram illustrating the hardware architecture of an MS 700 coupled with three subscriber identity cards and a single antenna according to an embodiment of the invention. The exemplary hardware architecture may be applied to any MS utilizing GSM/GPRS/EDGE, WCDMA, CDMA 2000, UMTS, TD-SCDMA, WiFi, WiMAX, LTE, LTE-A, or TD-LTE technologies. In the exemplary hardware architecture, three Radio Access Technology (RAT) modules, the GSM/GPRS module 720, the WCDMA module 730 and the UMTS module 740 may share a single antenna 750, and each RAT module contains at least an RF module and a baseband chip, to camp on a cell and operate in a stand-by mode, idle mode, connected mode, CELL_DCH mode, CELL_FACH mode, CELL_PCH mode, URA_PCH mode, and so on. As shown in FIG. 7, the GSM/GPRS baseband chip 721 is coupled to a GSM/GPRS RF module 722, the WCDMA baseband chip 731 is coupled to a WCDMA RF module A 732, and the UMTS baseband chip 741 is coupled to a UMTS RF module 742. Each baseband chip includes a processor, e.g. the GSM/GPRS baseband chip 721 includes a processor A 723, the WCDMA baseband chip 731 includes a processor C 733, and the UMTS baseband chip 741 includes a processor D 743. In addition, when operating in a specific mode, each RAT module may interact with one or more specific subscriber identity card as required, such as the (U)SIMs 772, 774 or 776. A multiplexer 770 is connected between the (U)SIM 772, 774 or 776 and the baseband chips 721/731/741 to enable bi-directional communications between the (U)SIM 772, 774 or 776 with the relevant baseband chips 721, 731, or 741. For example, the multiplexer 770 may be configured to enable the bi-directional communication between the (U)SIM 774 and the GSM/GPRS baseband chip 721 or the UMTS baseband chip 741. A switching device 760 is coupled between the shared antenna 750 and multiple Low Noise Amplifiers (LNAs). The switching device 760 may connect the antenna 750 to one LNA to allow the RF signals to pass through the connected LNA. Each LNA amplifies signals in a 2G/3G/4G band received by the shared antenna 750 and provides the signals to corresponding RF modules 722/732/742, wherein the 2G/3G/4G band may be a 900 MHz, 1800 MHz, 1900 MHz, or 2100 MHz band, or others. Once one of the baseband chips 721/731/741 attempts to perform a transceiving activity, such as a transmission (TX) or a reception (RX) activity, it issues a control signal Ctrl_GSM_band_sel, Ctrl_UMTS_band_sel or Ctrl_WCDMA_band_sel to direct the switching device 760 to connect the shared antenna 750 to a designated LNA. By issuing the control signals of Ctrl_GSM_band_sel, Ctrl_UMTS_band_sel or Ctrl_WCDMA_band_sel, each processor 723/733/743 may also control the operation associated with enhancing the data rate for a PS data service associated with one of the subscriber identity cards when another subscriber identity card is performing a scheduled measurement to maintain mobility or to receive messages. It is to be understood that the GSM/GPRS module 720, the WCDMA module B 730 and the UMTS module B 740 are given as examples. For those skilled in the art, any of the GSM/GPRS/EDGE, WCDMA, CDMA 2000, WiMAX, TD-SCDMA, LTE, LTE-A, TD-LTE, or other technologies may be used to implement the RAT modules 720, 730 and 740 in the hardware architecture without departing from the spirit of the invention, and the invention is not limited thereto. It is to be understood that the hardware architecture as shown in FIG. 7 may be modified to include less or more subscriber identity cards and/or RF modules relating to different RATs, and the invention is not limited thereto.

A SIM card typically contains user account information, an international mobile subscriber identity (IMSI), and a set of SIM application toolkit (SAT) commands. In addition, storage space for phone book contacts is provided in SIM cards. A micro-processing unit (MCU) of a baseband chip (referred to as a Baseband MCU hereinafter) may interact with the MCU of a SIM card (referred to as a SIM MCU hereinafter) to fetch data or SAT commands from the plugged SIM card. An MS is immediately programmed after the SIM card is plugged in. SIM cards may also be programmed to display custom menus for personalized services. A SIM card may further store a Home Public-Land-Mobile-Network (HPLMN) code to indicate an associated network operator, wherein the HPLMN code contains a Mobile Country Code (MCC) followed by a Mobile Network code. To further clarify, an IMSI is a unique number associated with a global system for mobile communication (GSM) or a universal mobile telecommunications system (UMTS) network user. An IMSI may be sent by an MS to a GSM or UMTS network to acquire other detailed information of the network user in the Home Location Register (HLR) or to acquire the locally copied detailed information of the network user in the Visitor Location Register (VLR). Typically, an IMSI is 15 digits long or shorter (for example, the MTN South Africa's IMSIs are 14 digits long). The first 3 digits are the Mobile Country Code (MCC), and are followed by the Mobile Network Code (MNC), either 2 digits (European standard) or 3 digits (North American standard). The remaining digits are the mobile subscriber identification numbers (MSIN) for a GSM or UMTS network user.

A USIM card is inserted in an MS for UMTS (also called 3G) telephony communication. A USIM card stores user account information, IMSI information, authentication information and a set of USIM Application Toolkit (USAT) commands therein, and provides storage space for text messages and phone book contacts. A USIM card may further store a Home Public-Land-Mobile-Network (HPLMN) code therein to indicate an associated network operator. A Baseband MCU may interact with an MCU of a USIM card (referred to as a USIM MCU hereinafter) to fetch data or USAT commands from the plugged in USIM card. Note that the phone book on the USIM card has been greatly enhanced from that of the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in UMTS. An MS is immediately programmed after plugging in the USIM card. In addition, an R-UIM or CSIM card is developed for a CDMA MS that is equivalent to the GSM SIM and 3G USIM, except that it is capable of working in CDMA networks. The R-UIM or CSIM card is physically compatible with the GSM SIM card, and provides a similar security mechanism for CDMA networks and network users.

Figure 8:
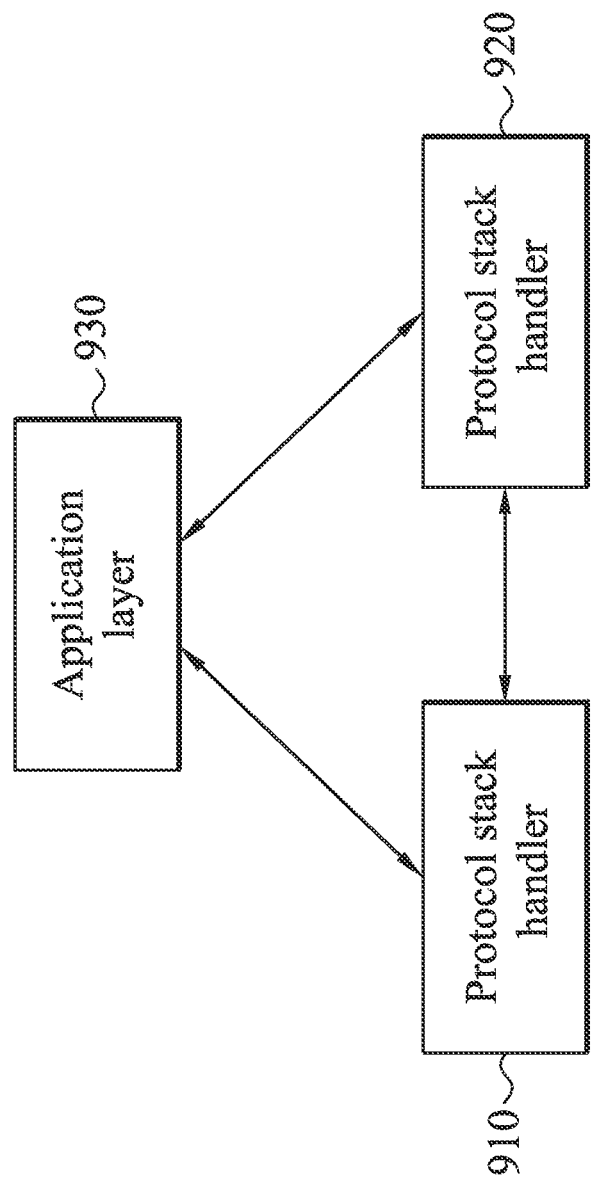
FIG. 8 is a block diagram illustrating the software architecture of an MS according to an embodiment of the invention.

FIG. 8 is a block diagram illustrating the software architecture of an MS according to an embodiment of the invention. The exemplary software architecture may contain the protocol stack handlers 910 and 920, and an application layer 930. The protocol stack handlers 910 is configured to execute operations related to the first subscriber identity card while the protocol stack handlers 920 is configured to execute operations related to the second subscriber identity card. In one embodiment, the first subscriber identity card may support one or more RATs (e.g. a SIM card that supports a single GSM/GPRS RAT or a CSIM card that supports both the CDMA RAT and the GSM/GPRS RAT), wherein the second subscriber identity card may also support one of the RATs that is supported by the first subscriber identity card (e.g. the CDMA RAT or the GSM/GPRS RAT). The protocol stack handler 910 may be configured to communicate with a first service network and/or a second service network (e.g. the service network 130 and/or 150) with a first subscriber identity card (e.g. the subscriber identity card 30), while the protocol stack handler 920 is configured to communicate with a third service network (e.g. the service network 140) with a second subscriber identity card (e.g. the subscriber identity card 20), wherein the third service network may be configured with the same or different RAT as the first and/or the second service network. The application layer 930 may contain program logics for providing the MMI 650 as illustrated in FIG. 5 and FIG. 6. The MMI is the means by which people interact with the MS, and the MMI may contain screen menus and icons, a keyboard, shortcuts, command language, and online help, as well as physical input devices, such as buttons, a touch screen, and a keypad. By the input devices of the MMI, users may manually touch, press, click, or move the input devices to operate the MS for making or answering a phone call, texting, or sending or viewing short messages, multimedia messages, e-mails or instant messages, surfing the Internet, or others. Correspondingly, the application layer 930 may contain a web browser allowing a user to browse the Internet, a streaming video player allowing a user to watch streaming videos online, an e-mail client allowing a user to edit, browse, or send e-mail messages, and/or a data call agent allowing a user to initiate or receive a data call.

When the protocol stack handler 920 is performing a packet-switched (PS) data service on-line, the protocol stack handler 910, when executed by a processor (e.g. 612 of FIG. 5 or 6, or 723, 733 or 743 of FIG. 7), may direct requisite circuits of a Baseband chip (e.g. 610 of FIG. 5, 710 of FIG. 6, or 721, 731 or 741 of FIG. 7) with a relevant RF module (e.g. 620 of FIG. 5 or 6, or 722, 732 or 742 of FIG. 7) to constantly listen to the paging channel for paging messages sent from the first service network and/or the second service network. In an embodiment, the protocol stack handler 910 may listen to the paging channel (PCH) for paging messages within an associated Discontinuous Reception (DRX) group or an associated paging group signaled by a higher layer when the associated first or second service network is a GSM network. In another embodiment, when the associated first or second service network is a WCDMA or UMTS network, the protocol stack handler 910 may listen to the associated paging indicator (PI) messages which are transmitted in the Paging Indicator Channel (PICH) in the paging occasion at each DRX cycle, and listen to the PCH in an associated Secondary Common Control Physical Channel (S-CCPCH) for paging messages when the PICH carries a PI message intended for the MS. Specifically, the protocol stack handler 910 may listen to the PI on the PICH or the paging messages on the PCH by taking control of the single radio hardware resource, which causes an interruption of the PS data service associated with the protocol stack handler 920 and damages the data rate. When the protocol stack handler 910 receives a paging message intended for the MS for a CS service such as an MT call, an MT SMS, or others, the protocol stack handler 910 may request the protocol stack handler 920 to suspend the PS data service.

In another embodiment, the protocol stack handler 910, when executed by the processor, may direct requisite circuits of the Baseband chip with the relevant RF module—to perform power measurements with the first service network or the second service network while the protocol stack handler 920 performs a PS data service. From the power measurement results, the protocol stack handler 910 may make cell reselection decisions depending on different cell reselection criteria corresponding to each radio access technology (RAT).

Figure 9:
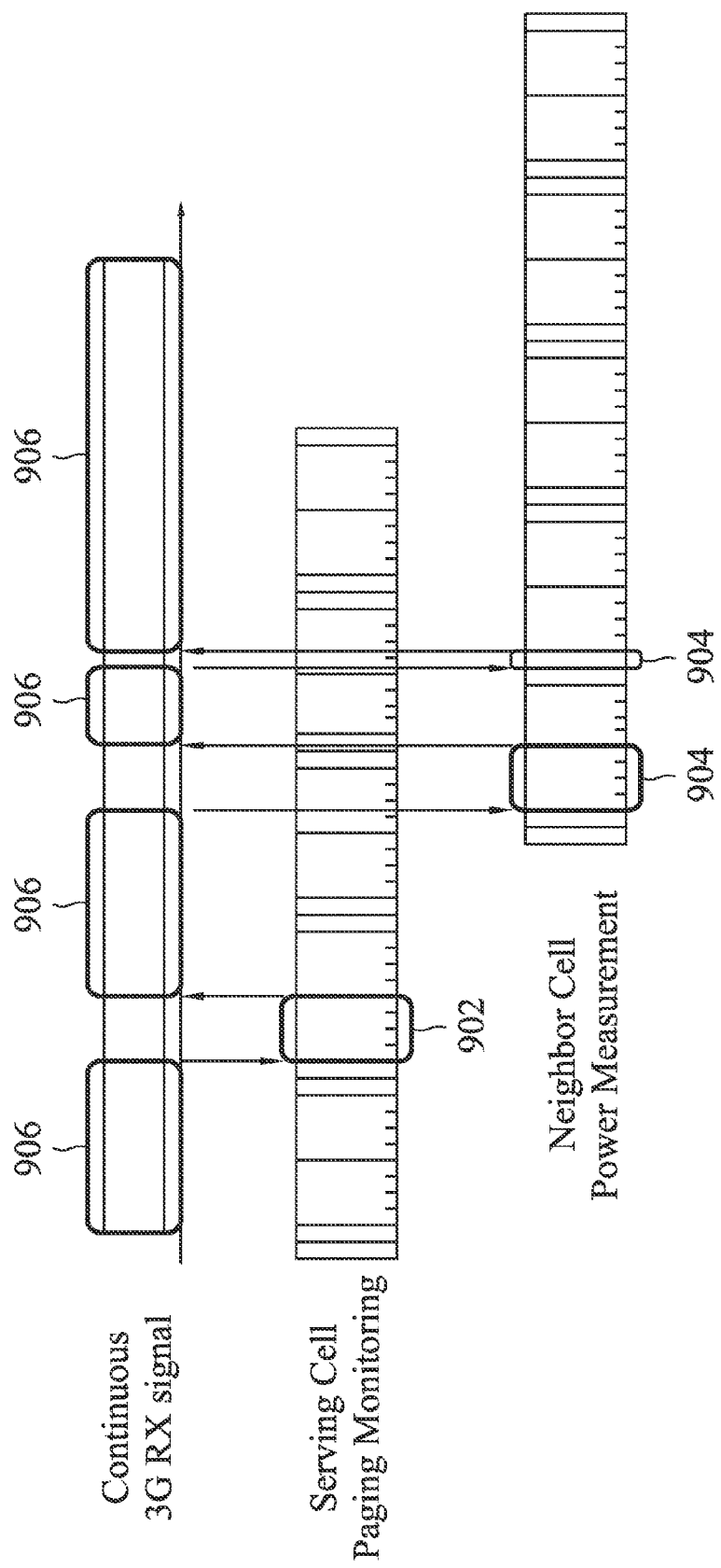
FIG. 9 is a diagram illustrating channel occupancy time for an MS that monitors a 2G CS paging channel and makes 2G power measurements in a 3G packet transfer mode according to an embodiment of the invention.

FIG. 9 is a diagram illustrating channel occupancy time for an MS that monitors a 2G CS paging channel and makes 2G power measurements in a 3G packet transfer mode according to an embodiment of the invention. Assume that the protocol stack handler 920, when executed by the processor, performs a packet-switched (PS) data service (e.g. e-mail, web browsing and so on) on-line with a second service network (e.g. a UMTS service network 150) with a second subscriber identity card (e.g. the subscriber identity card 40), and the protocol stack handler 910, when executed by the same or a different processor, communicates with a first service network (e.g. the 2G GSM/GPRS/EDGE service network 130) with a first subscriber identity card (e.g. the subscriber identity card 20). The protocol stack handler 910 may constantly listen to the 2G paging channel in a common control channel (CCCH) for paging messages sent from the first service network (e.g. the CS paging 902). The protocol stack handler 910 may synchronize itself with the paging cycle associated with the first service network, calculate paging occasions of the paging channel, and wake up at the right moment in time to listen to the CS paging 902 (e.g. by taking control of the single radio resource hardware such as a single antenna or single RF module over the protocol stack handler 920). If no paging messages intended for the MS are received, the protocol stack handler 910 returns the control of the radio resource hardware back to the protocol stack handler 920, and the protocol stack handler 920 may continue with the CS paging 902. While the protocol stack handler 910 listens to the CS paging 902, the 3G PS data transfer 906 performed by the protocol stack handler 920 may experience a momentary discontinuous data reception, and the protocol stack handler 920 may recover the lost data packets by requesting for retransmission or by other data recovery methods. It is assumed that those skilled in the art are knowledgeable about data retransmission techniques, and thus, detailed examples are not provided further. As described above, since the monitoring of the CS paging 902 may constantly interrupt the 3G PS data transfer 906, the data rate associated with the second identity card may be damaged due to the monitoring of the 2G CS paging channel made for the first subscriber identity card. Similarly, 3G CS paging channel monitoring is also performed according to the associated DRX cycle. The associated paging indicators (PI) which are transmitted in the Paging Indicator Channel (PICH) in the paging occasion at each DRX cycle is monitored, and the associated S-CCPCH for paging messages is monitored if the PICH carries a PI message intended for the MS (e.g. by taking control of the single radio resource hardware such as a single antenna or single RF module over the protocol stack handler 920). The PICH is a fixed rate (SF=256) physical channel used to carry the PI, wherein the PICH is always associated with an S-CCPCH to which a paging channel (PCH) transport channel is mapped, and a PI set in a PICH frame means that the paging message is transmitted on the PCH in the S-CCPCH frame starting $t_{PICH}$ chips ($t_{PICH}$=7680 chips or 3 slots) after the PICH frame is transmitted. The protocol stack handler 910 may synchronize with the paging cycle of the network, calculate the paging occasions of the PICH, and wake up at the right moment in time to listen to its allocated PICH (e.g. by taking control of the radio resource hardware over the protocol stack handler 920), and the protocol stack handler 910 may wait and listen to the associated S-CCPCH (the associated S-CCPCH arrives $t_{PICH}$ after the PICH) for paging messages if the PICH carries a PI message intended for the MS.

The protocol stack handler 910 may also be configured to perform power measurements of the neighbor cells with the first service network. For example, the protocol stack handler 910 may take control of the radio resource hardware to make the 2G power measurements 904 (e.g. RSSI of BCCH and BSIC (Base Station Identity Code) for surrounding candidate cells). The 2G power measurements 904 made by the protocol stack handler 910 may constantly interrupt the 3G PS data transfer 906, such that the data rate associated with the second identity card may be damaged due to the 2G power measurements 904 made for the first subscriber identity card. Alternatively, in a UMTS/WCDMA network, the protocol stack handler 910 makes power measurements to the CPICH (e.g. Ec/No, RSCP and so on) of candidate cells in a PM mode. When the first subscriber identity card corresponds to an LTE, LTE-A or WiMAX network, the protocol stack handler 910 may make power measurements of different pilot signals according to different RATs in the PM mode. The protocol stack handler 910, when executed by the processor, performs power measurements of candidate cells and uses the power measurement results such as measured signal quality and/or signal strength of the BCCH, CPICH, or others as an input for handover and/or cell reselection decisions. From the power measurement results, the protocol stack handler 910 may make cell reselection decisions depending on different cell reselection criteria corresponding to each radio access technology (RAT). For example, for a GSM network, the cell reselection criteria may be based on the C1 and C2 criterions. For a UMTS network or a WCDMA network, there may be other cell reselection criteria such as a cell rank criteria or the R criteria.

In the embodiment in FIG. 8, when the protocol stack handler 910 is unable to find a suitable cell to camp on for the first subscriber identity card, the protocol stack handler 910 may attempt to camp on a cell irrespective of the PLMN identity, and enter a "limited service" state in which it can only attempt to make emergency calls. When the protocol stack handler 910 is in a limited state and is not performing a search procedure to recover from the limited service state, the purpose of the power measurements, the cell selection or cell re-selection procedures performed by the protocol stack handler 910 is only for maintaining the limited service state. However, the PS data rate associated with the second identity card may still be damaged due to the power measurements, the cell selection or cell re-selection procedures made by the first subscriber identity card. In this case, it is desired to decrease the power measurements, the cell selection or cell re-selection procedures made by the protocol stack handler 910 in order to enhance the PS data rate associated with the second identity card. In another embodiment, when the protocol stack handlers 910 is configured to execute operations related to the first subscriber identity card while the protocol stack handlers 920 is configured to execute operations related to the second subscriber identity card, the first subscriber identity card supports 2 or more RATs, wherein the second subscriber identity card supports one of the RATs that is supported by the first subscriber identity card. When the second subscriber identity card performs a PS data service on-line, the paging monitoring, such as the PI monitoring on the PICH and/or the paging message monitoring on the PCH, and the inter-RAT power measurements associated with the first subscriber identity card may cause more damage to the PS data rate associated with the second subscriber identity card. In this embodiment, it is desired to avoid the inter-RAT power measurements or handover to a RAT that causes less damage to the PS data rate associated with the second subscriber identity card.

Figure 10:
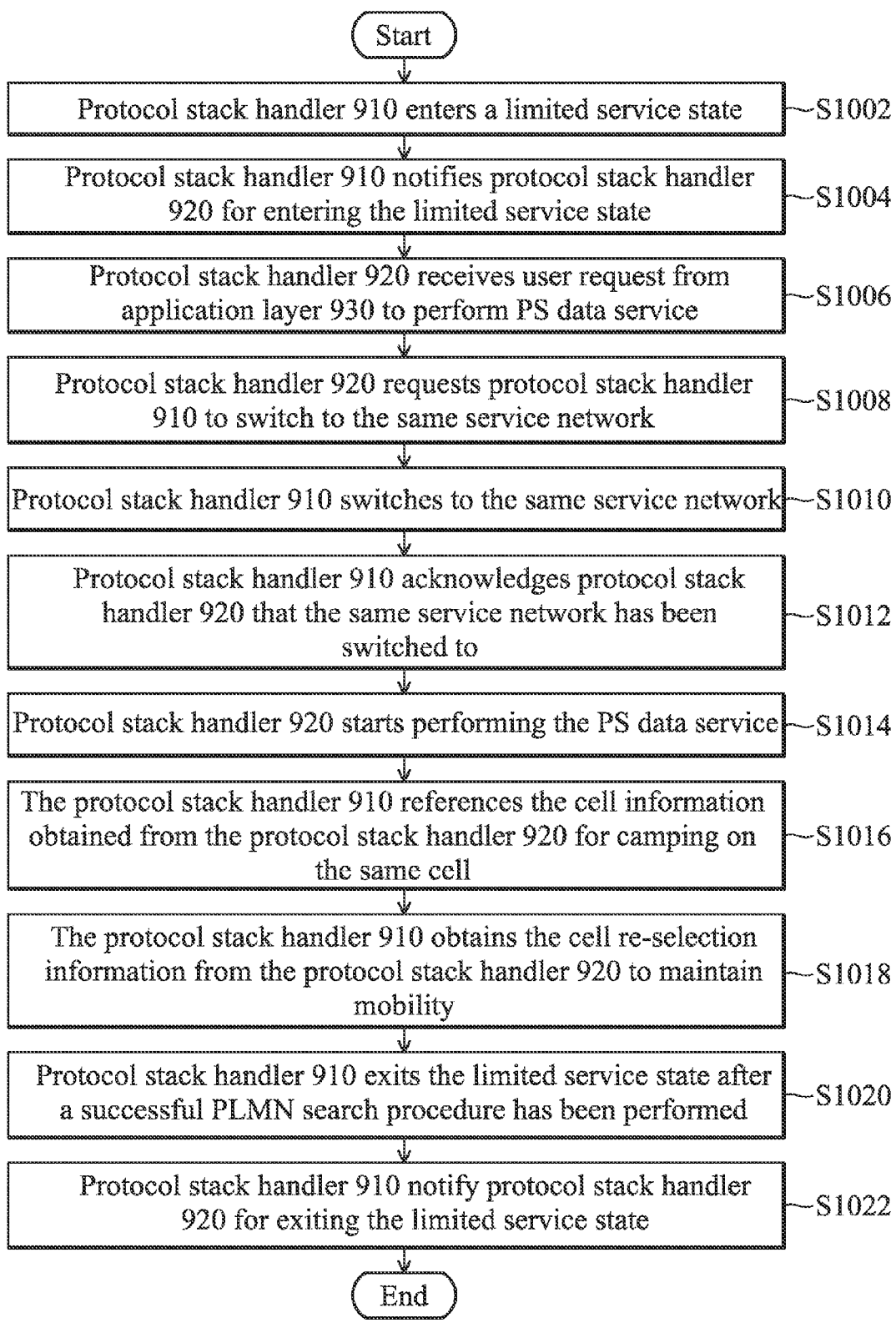
FIG. 10 is a flow chart illustrating a method for enhancing the data rate for a packet-switched (PS) data service associated with the second subscriber identity card when the protocol stack handler 910 is in the idle mode for the first subscriber identity card by using the software architecture of FIG. 8 according to an embodiment of the invention.

FIG. 10 is a flow chart illustrating a method for enhancing the data rate for a packet-switched (PS) data service associated with the second subscriber identity card when the protocol stack handler 910 is in the idle mode for the first subscriber identity card by using the software architecture of FIG. 8 according to an embodiment of the invention. The protocol stack handlers 910 is configured to execute operations related to the first subscriber identity card while the protocol stack handlers 920 is configured to execute operations related to the second subscriber identity card. The first subscriber identity card may support one or more RATs (e.g. a SIM card that supports a single GSM/GPRS RAT or a CSIM card that supports both the CDMA RAT and the GSM/GPRS RAT), wherein the second subscriber identity card may support one of the RATs that is supported by the first subscriber identity card (e.g. the UMTS RAT, the CDMA RAT, or the GSM/GPRS RAT). Initially, the protocol stack handlers 910 and 920 are in the idle mode, and the protocol stack handler 910 enters a limited service state in which the protocol stack handler 910 may only attempt to make emergency calls (Step S1002). The protocol stack handler 910 may enter the limited service state due to "No suitable cell" or other reasons. As described previously, if the MS is unable to obtain normal services from a PLMN, the MS may attempt to camp on an acceptable cell, irrespective of its PLMN identity, so that emergency calls can be made if necessary. Upon entering the limited service state, the protocol stack handler 910 may notify the protocol stack 920 when entering the limited service state (Step S1004). In the notification for entering the limited service, the protocol stack handler 910 may include information about the RAT being used. The protocol stack handler 920 may use a flag or marker to note the condition when the protocol stack handler 910 enters a limited service state using the same RAT as the protocol stack handler 920, e.g. the default value of the flag or marker may be set to "OFF", the value of the flag or marker may be set to "ON" when the protocol stack handler 910 enters the limited service state using the same RAT as the protocol stack handler 920, and the value of the flag or marker may be set to "OFF" when the protocol stack handler 910 exits the limited service state. For example, the protocol stack handler 910 may notify the protocol stack handler 920 upon entering the limited service state. In the notification for entering the limited service, the protocol stack handler 910 may include the RAT being used (e.g. GSM/GPRS RAT). The protocol stack handler 920 may set the value of the flag or marker to "ON" when the protocol stack handler 920 is also using the GSM/GPRS RAT.

Subsequent to step S1004, the protocol stack handler 920 receives a user request from the application layer 930 to perform a PS data service such as push e-mail, IM, or others, with an associated service network (e.g. the service network 120) using a certain RAT (e.g. the GSM/GPRS RAT) (Step S1006). In this embodiment, the protocol stack handlers 920 may check if the protocol stack handlers 910 uses the same RAT, and request the protocol stack handler 910 to switch to the same service network when the same RAT is used. Next, the protocol stack handler 920 requests the protocol stack handler 910 to switch to the same service network (e.g. the service network 120) (step S1008). It is to be understood that the protocol stack handler 910 may still be in the limited service state after it switches to the same service network as instructed by the protocol stack handler 920. In one embodiment, step S1008 may also be performed after the protocol stack handler 920 starts the PS data service. For example, when the protocol stack handler 910 enters the limited service state after the protocol stack handler 920 has already begun with the PS data service session, the protocol stack handler 920 may request the protocol stack handler 910 to switch to the same service network as soon as the protocol stack handler 920 receives the notice for entering the limited service state of the same RAT from the protocol stack handler 910. Next, the protocol stack handler 910 switches to the same service network (Step S1010).

After switching to the same service network, the protocol stack handler 910 acknowledges to the protocol stack handler 920 that the same service network has been switched to (Step S1012). After the acknowledgement from the protocol stack handler 910 is received, the protocol stack handler 920 starts to perform the PS data service instructed by the application layer 930 (Step S1014). In order to perform the PS data service, the protocol stack handler 920 may perform the GPRS attach procedure as illustrated in FIG. 3 or the PDP context activation procedure as illustrated in FIG. 4. Next, in Step S1016, the protocol stack handler 910 may reference the cell information obtained from the protocol stack handler 920 for camping on the same cell. Taking GSM as example, the cell information may include the frequency, the timing of frame 0 and/or the System Information broadcasted in BCCH. Taking UMTS as example, the cell information may include the system information, the neighbor cell list, the measurement results of the serving and neighbor cells, and so on. It is noted that the protocol stack handler 910 consumes less time to instruct the relevant RF module to perform operations camping on the same cell, which have to interrupt PS data transfer for the second subscriber identity card, when obtaining more information from the protocol stack handler 920. That is, more cell information sharing causes less damage to the PS data throughput for the second subscriber identity card. For example, when only obtaining the frequency of the camp-on cell by the protocol stack handler 920, the protocol stack handler 910 instructs the GSM/GPRS RF module to seek timing of the frame 0 at the obtained frequency, obtain System Information from the BCCH, and so on. Contrarily, when obtaining all requisite cell information from the protocol stack handler 920, the protocol stack handler 910 has no need to perform any operation to camp on the same cell as the protocol stack handler 920. Once the user makes an emergency call attempt with the first subscriber identity card, the protocol stack handler 910, for example, can issue a random access channel (RACH) request to the same cell being camped on by the protocol stack handler 920 with reference to the collected cell information. The protocol stack handler 910 may obtain the cell re-selection information from the protocol stack handler 920 to maintain mobility (Step S1018). Specifically, in one example, the protocol stack handler 920 may actively notify the protocol stack handler 910 of new cell information once re-selecting to a new cell. In another example, the protocol stack handler 910 may periodically ask the protocol stack handler 920 if a cell-reselection occurs, for example, every 0.5 second, and if so, obtains new cell information therefrom. Similarly, as discussed above, more new cell information sharing causes less damage to the PS data throughput for the second subscriber identity card.

While in the limited service state, the protocol stack handler 910 may still perform the periodic PLMN search procedure to recover from the limited service state, for example, every 20 seconds. As known by those skilled in the art, during the PLMN search procedure, the MS may perform a power scan to find out proper cells to camp on. Once a successful PLMN search procedure is completed, the protocol stack handler 910 may find out proper cells to camp on and exit the limited service state (Step S1020). After exiting the limited service state, the protocol stack handler 910 may notify the protocol stack handler 920 when exiting the limited service state (Step S1022). Upon receiving the notification for exiting the limited service state, the protocol stack handler 920 may set the value of the aforementioned flag or marker to "OFF" to indicate that the protocol stack handler 910 has exited the limited service state. Upon exiting the limited service state, the protocol stack handler 910 may also notify the application layer 930. The application layer 930 may notify the user of the status related to the first subscriber identity card by showing messages such as "first subscriber identity card in service" or others.

Figure 11:
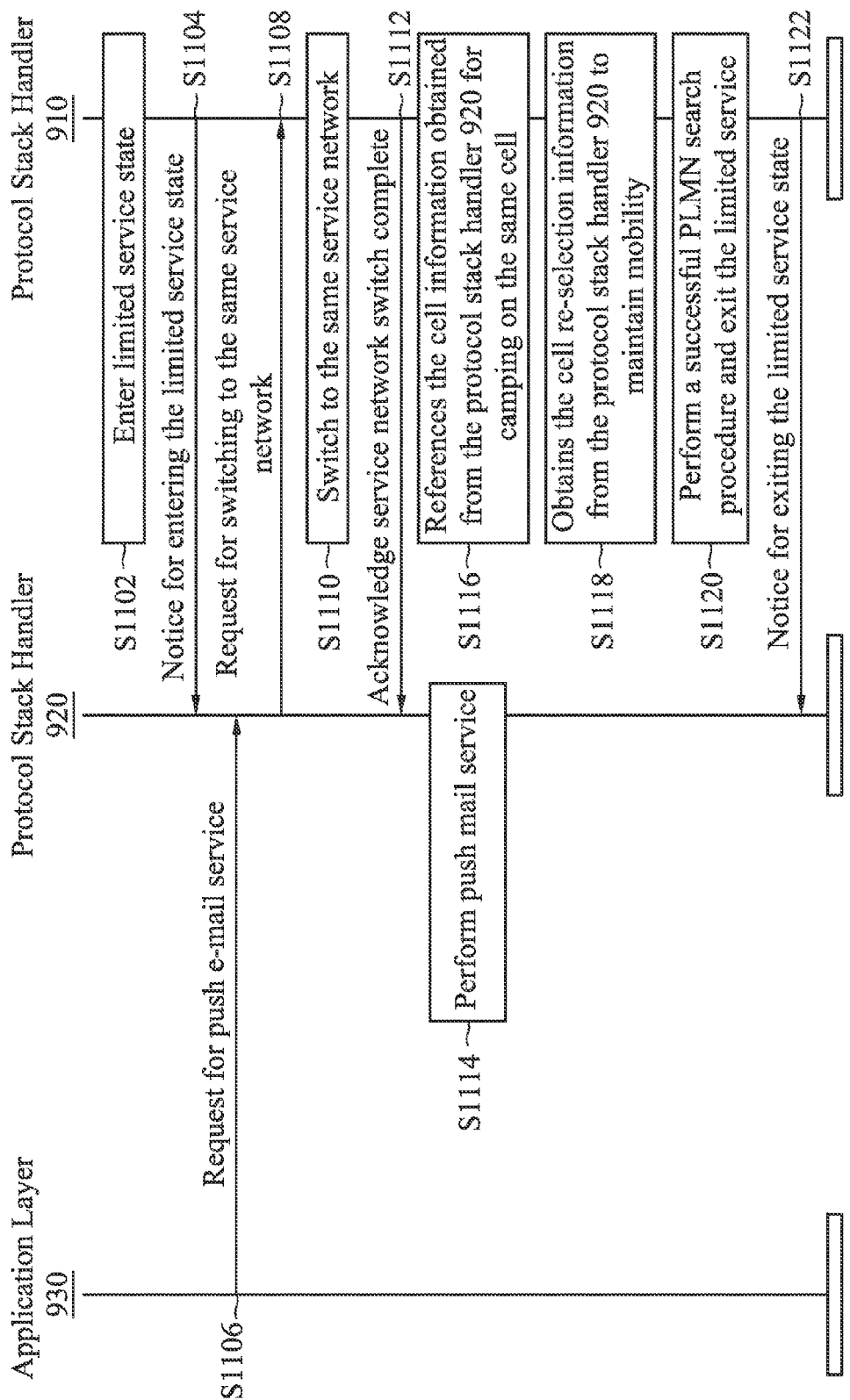
FIG. 11 is a message sequence chart illustrating the method for enhancing the data rate for a packet-switched (PS) data service associated with the first subscriber identity card when the second subscriber identity card is performing a scheduled measurement according to the embodiment of FIG. 10.

FIG. 11 is a message sequence chart illustrating the method for enhancing the data rate for a packet-switched (PS) data service associated with the second subscriber identity card when the protocol stack handler 910 is in the idle mode for the first subscriber identity card according to the embodiment of FIG. 10. The first subscriber identity card may support one or more RATs (e.g. a SIM card that supports a single GSM/GPRS RAT or a CSIM card that supports both the CDMA RAT and the GSM/GPRS RAT), wherein the second subscriber identity card may support one of the RATs that is also supported by the first subscriber identity card (e.g. the UMTS RAT, the CDMA RAT, or the GSM/GPRS RAT). Initially, the protocol stack handlers 910 and 920 are in the idle mode, and the protocol stack handler 910 enters a limited service state in which the protocol stack handler 910 may only attempt to make emergency calls (Step S1102). The protocol stack handler 910 may enter the limited service state due to "No suitable cell" or other reasons. Upon entering the limited service state, the protocol stack handler 910 may notify the protocol stack 920 when entering the limited service state (Step S1104). In the notification for entering the limited service, the protocol stack handler 910 may include information about the RAT being used. The protocol stack handler 920 may use a flag or marker to note the condition when the protocol stack handler 910 enters a limited service state using the same RAT as the protocol stack handler 920. Subsequent to step S1104, the protocol stack handler 920 receives a user request from the application layer 930 to perform a PS data service such as a push e-mail service request with the associated service network (e.g. the service network 120) using a certain RAT (e.g. the GSM/GPRS RAT) (Step S1106). Next, the protocol stack handler 920 requests the protocol stack handler 910 to switch to the same service network (e.g. the service network 120) (step S1108). It is to be understood that the protocol stack handler 910 may still be in the limited service state after it handover to the service network as instructed by the protocol stack handler 920. Next, the protocol stack handler 910 switches to the same service network and acknowledges to the protocol stack handler 920 that the same service network has been switched to (Step S1110 and Step S1112). Reference for detailed descriptions regarding the operations for switching of the service network may be made to the aforementioned descriptions relating to FIG. 10. After the acknowledgement from the protocol stack handler 910 is received, the protocol stack handler 920 starts to perform the PS data service instructed by the application layer 930 (Step S1114). Next, the protocol stack handler 910 may reference the cell information obtained from the protocol stack handler 920 for camping on the same cell (Step 1116). Taking GSM as example, the cell information may include the frequency, the timing of frame 0 and/or the System Information broadcasted in BCCH. Taking UMTS as example, the cell information may include the system information, the neighbor cell list, the measurement results of serving and neighbor cells, and so on. It is noted that the protocol stack handler 910 consumes less time to instruct the relevant RF module to perform operations camping on the same cell, which have to interrupt PS data transfer for the second subscriber identity card, when obtaining more information from the protocol stack handler 920. That is, more cell information sharing causes less damage to the PS data throughput for the second subscriber identity card. For example, when only obtaining the frequency of the camp-on cell by the protocol stack handler 920, the protocol stack handler 910 instructs the GSM/GPRS RF module to seek timing of the frame 0 at the obtained frequency, obtain System Information from the BCCH, and so on. Contrarily, when obtaining all requisite cell information from the protocol stack handler 920, the protocol stack handler 910 has no need to perform any operation to camp on the same cell as the protocol stack handler 920. Once the user makes an emergency call attempt with the first subscriber identity card, the protocol stack handler 910, for example, can issue a random access channel (RACH) request to the same cell being camped on by the protocol stack handler 920 with reference to the collected cell information. The protocol stack handler 910 may obtain the cell re-selection information from the protocol stack handler 920 to maintain mobility (Step S1118).

While in the limited service state, the protocol stack handler 910 may still perform the periodic PLMN search procedure to recover from the limited service state. Once a successful PLMN search procedure is completed, the protocol stack handler 910 may find out proper cells to camp on and exit the limited service state (Step S1120). After exiting the limited service state, the protocol stack handler 910 may notify the protocol stack handler 920 when exiting the limited service state (Step S1122). Upon exiting the limited service state, the protocol stack handler 910 may also notify the application layer 930. The application layer may notify the user of the status related to the first subscriber identity card by showing messages such as "first subscriber identity card in service" or others.

Figure 12A:
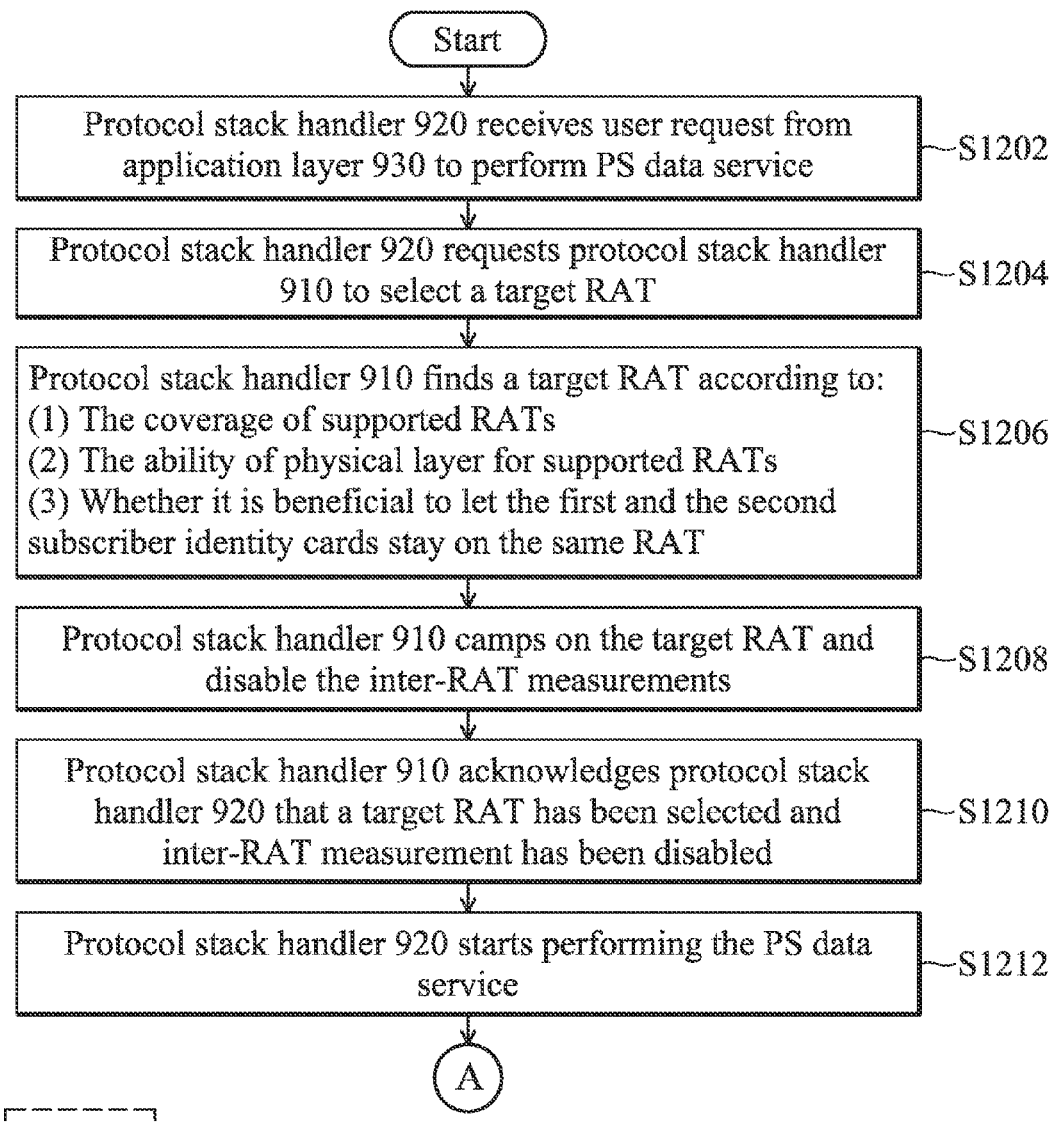
FIG. 12A and FIG. 12B is a flow chart illustrating a method for enhancing the data rate for a packet-switched (PS) data service associated with the second subscriber identity card when protocol stack handler 910 is in the idle mode for the first subscriber identity card by using the software architecture of FIG. 8 according to another embodiment of the invention.
Figure 12B:
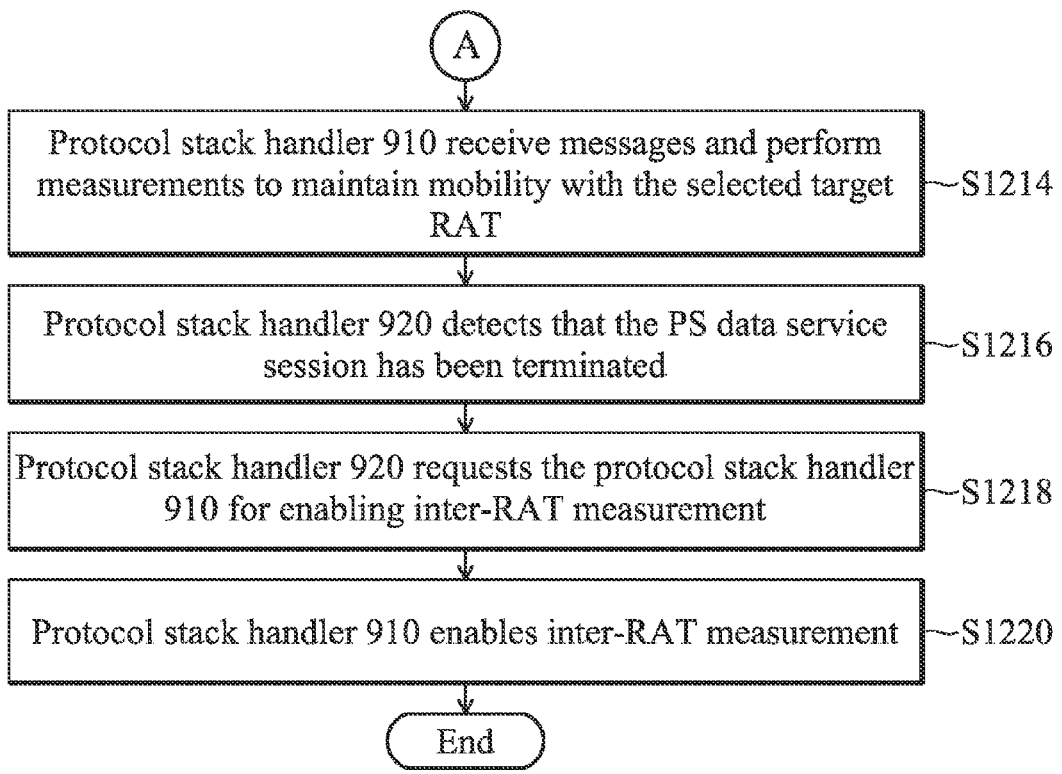

FIG. 12A and FIG. 12B is a flow chart illustrating a method for enhancing the data rate for a packet-switched (PS) data service associated with the second subscriber identity card when the protocol stack handler 910 is in the idle mode for the first subscriber identity card by using the software architecture of FIG. 8 according to another embodiment of the invention. The protocol stack handler 910 is configured to execute operations related to the first subscriber identity card while the protocol stack handler 920 is configured to execute operations related to the second subscriber identity card. Specifically, the first subscriber identity card may support more than one RAT (e.g. a CSIM card that supports both the CDMA RAT and the GSM/GPRS RAT). Initially, the protocol stack handlers 910 and 920 are in the idle mode, and the protocol stack handler 920 receives a user request from the application layer 930 to perform a PS data service such as push e-mail, IM, or others using a certain RAT (e.g. the CDMA RAT) (Step S1202). Next, the protocol stack handler 920 requests the protocol stack handler 910 to select a suitable target RAT before starting the PS data service session (step S1204), wherein the target RAT is a RAT that may cause the least damage to the PS data rate of the PS data service associated with the protocol stack handler 920. Specifically, the protocol stack handler 910 may select a target RAT according to but not limited to the following three target RAT factors:

(1) The Coverage of the Supported RATs:

Generally, a 2G network or 2G RAT has better coverage than a 3G network or a 3G RAT in terms of radio frequency (RF) coverage. Therefore, when the protocol stack handler 910 listens to the PCH for paging messages, there is less chance for performing an out-of-service frequency scan. The protocol stack handler 910 selects the target RAT which has a better RF coverage in order to avoid the out-of-service frequency scan.

(2) The Ability of the Physical Layer of the Supported RATs:

The ability of the physical layer of the supported RATs is the time consumption for the protocol stack handler 910 to perform operations related to receive messages from the associated RAT and/or maintain mobility in the RAT. For example, the time consumed for performing the operations to receive messages and/or maintain mobility, such as the frequent power measurements and the monitoring of paging messages as described in FIG. 9. The protocol stack handler 910 selects a suitable RAT which requires the minimum time to receive messages and/or maintain mobility.

(3) Whether it is Beneficial to Let the First and the Second Subscriber Identity Cards Stay on the Same RAT:

When the first and the second subscriber identity cards stays in the same RAT (e.g. GPRS), some improvements may be used to enhance the PS data rate associated with the protocol stack handler 920. For example, the protocol stack handler 910 may reference the cell information measured by the protocol stack handler 920, as described previously in FIG. 10 (Step S1206).

In one embodiment, the MS may have a pre-defined stored database of the supported RAT coverage or the physical layer ability of the supported RATs, wherein the supported RAT coverage database may include a predefined ranking in terms of the RF coverage for the supported RATs (e.g. the GSM RAT has a better RF coverage than the UMTS RAT), and the database of the physical layer ability of the supported RATs may include a predefined list of the theoretical time to receive messages and/or maintain mobility for the supported RATs. In another embodiment, the MS may keep a dynamic record of the RF coverage and the physical layer ability of the supported RATs. For example, the MS may keep a dynamic record of the call drop count due to a lack of RF coverage (or other performance metrics) for the supported RAT for a pre-defined duration (e.g. the most recent 24 hours). And the protocol stack handler 910 may use the dynamic record as a reference of the RF coverage in step S1206. In another embodiment, the protocol stack handler 910 may assign different weighting ratios to the three suitable RAT factors when selecting the suitable RAT. For example, the coverage of the supported RAT may be assigned with 40% weighting ratio, the ability of the physical layer of the supported RAT may be assigned with 35% ratio, and letting the first and the second subscriber identity cards stay on the same RAT may be assigned with 25% weighting ratio. Alternatively, the coverage of the supported RAT may be assigned with 30% weighting ratio, the ability of the physical layer of the supported RAT may be assigned with 50% ratio, and letting the first and the second subscriber identity cards stay on the same RAT may be assigned with 20% weighting ratio. It is to be understood that the protocol stack handler 910 may also perform the steps S1206 and S1208 to select and camp on a new target RAT when the protocol stack handler 910 loses coverage with the existing target RAT. For example, when the existing target RAT no longer satisfies the reselection criteria (e.g. the C2 criterion in the GSM RAT and the R criterion in the UMTS RAT), the protocol stack handler 910 may go out of service if a cell selection procedure or a frequency scan is not performed immediately to select another target RAT. In still another embodiment, the mentioned target RAT selection may be alternatively performed by the protocol stack handler 920, and notify the results (i.e. suggest target RAT) to the protocol stack handler 910.

After the target RAT has been selected in step S1206, the protocol stack handler 910 further camps on the target RAT and disables the inter-RAT measurement (Step S1208). That is, the protocol stack handler 910 camps on one of the cells of the target RAT. After camping on the target RAT, the protocol stack handler 910 may perform normal circuit switched (CS) or PS operations with the target RAT. In step S1208, the protocol stack handler 910 also disables the inter-RAT measurement, wherein the inter-RAT measurement is the power measurements made to a different RAT supported by the same subscriber identity card (e.g. the first subscriber identity card). It is to be understood that the inter-RAT measurement may take a longer time than the intra-RAT measurement. For example, the required time to make GSM power measurements (e.g. the RSSI of BCCH) when the MS is using a GSM RAT (intra-RAT measurement) may be shorter than the required time to make GSM power measurements when the MS is using a CDMA RAT (inter-RAT measurement). In this case, performing inter-RAT measurement for the first subscriber identity card may cause greater damage to the PS data throughput of the second subscriber identity card. As such, by selecting a suitable RAT in step S1206 and disabling the inter-RAT measurement, the protocol stack handler 910 may minimize the time required to receive messages or maintain mobility within the associated service network.

Subsequent to step S1208, the protocol stack handler 910 acknowledges to the protocol stack handler 920 that a suitable RAT has been selected and the inter-RAT measurement has been disabled (Step S1210). The protocol stack handler 920 may use a flag or marker to note the condition when the protocol stack handler 910 has disabled the inter-RAT measurement, e.g. the default value of the flag or marker may be set to "OFF", the value of the flag or marker may be set to "ON" when the protocol stack handler 910 has disabled the inter-RAT measurement, and the value of the flag or marker may be set to "OFF" when the protocol stack handler 910 has enabled the inter-RAT measurement. After the acknowledgement from the protocol stack handler 910 is received, the protocol stack handler 920 may start to perform the PS data service instructed by the application layer 930 (Step S1212). In order to perform the PS data service, the protocol stack handler 920 may perform the GPRS attach procedure as illustrated in FIG. 3 or the PDP context activation procedure as illustrated in FIG. 4. At the same time, the protocol stack handler 910 may receive messages (e.g. PI or paging messages) and perform measurements to maintain mobility (e.g. the RSSI of BCCH and/or the RSCP and Ec/No of CPICH) with the selected target RAT (Step S1214). Next, the protocol stack handler 920 may detect that the PS data service session has been terminated (Step S1216). Specifically, the protocol stack handler 920 may detect a GPRS detach procedure performed or a PDP context deactivation procedure to end the current PS data service session. After the PS data service session has been terminated, the protocol stack handler 920 may request the protocol stack handler 910 to enable the inter-RAT measurement (Step S1218). Upon receiving the request from the protocol stack handler 920, the protocol stack handler 910 may enable the inter-RAT measurement and perform the inter-RAT cell reselection according to the inter-RAT measurement results (Step S1220). Moreover, the protocol stack handler 920 may set the value of the flag or marker to "OFF" to indicate that the protocol stack handler 910 has enabled the inter-RAT measurement.

Figure 13:
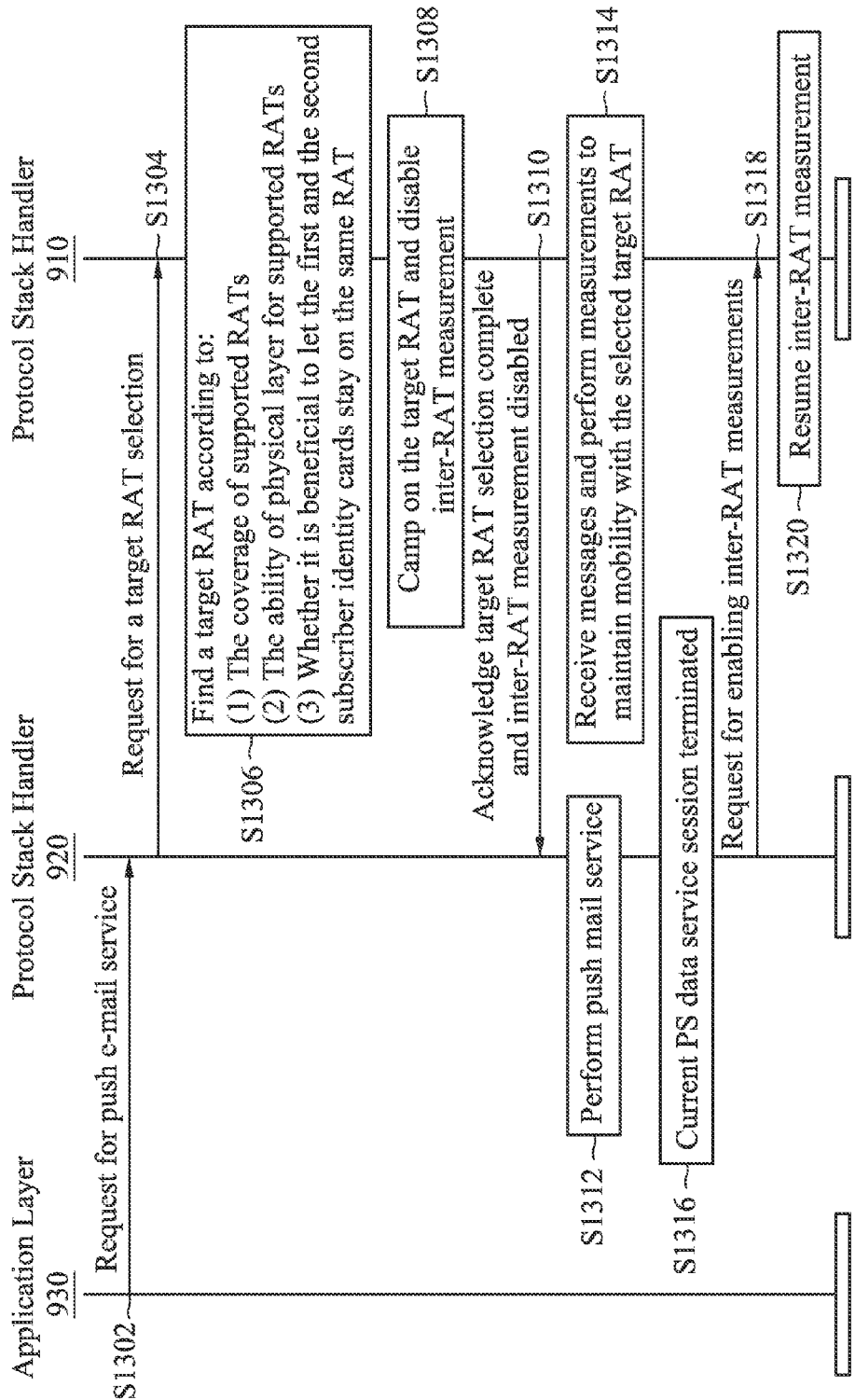
FIG. 13 is a message sequence chart illustrating the method for enhancing the data rate for a packet-switched (PS) data service associated with the second subscriber identity card when the protocol stack handler 910 is in the idle mode for the first subscriber identity card according to the embodiment of FIG. 12A and FIG. 12B.

FIG. 13 is a message sequence chart illustrating the method for enhancing the data rate for a packet-switched (PS) data service associated with the second subscriber identity card when the protocol stack handler 910 is in the idle mode for the first subscriber identity card according to the embodiment of FIG. 12A and FIG. 12B. Initially, the protocol stack handlers 910 and 920 are in the idle mode, and the protocol stack handler 920 receives a user request from the application layer 930 to perform a PS data service such as push e-mail (Step S1302). Next, the protocol stack handler 920 requests the protocol stack handler 910 to select a suitable target RAT before starting the PS data service session (step S1304). The suitable RAT is a RAT that may cause the least damage to the PS data rate of the PS data service associated with the protocol stack handler 920. Specifically, the protocol stack handler 910 may select a suitable RAT according to but not limited to the aforementioned factors.

Reference for detailed descriptions regarding the methods for acquiring the suitable RAT factors for the supported RATs may be made to the aforementioned descriptions relating to FIG. 12A and FIG. 12B. After a target RAT has been selected in step S1306, the protocol stack handler 910 camps on the target RAT and disables the inter-RAT measurement (Step S1308). Reference for detailed descriptions regarding the operations for camping on the target RAT may be made to aforementioned descriptions relating to the operations for a PLMN search procedure. After camping on the target RAT, the protocol stack handler 910 may perform normal circuit switched (CS) or PS operations with the selected target RAT. In step S1308, the protocol stack handler 910 also disables the inter-RAT measurement.

Subsequent to step S1308, the protocol stack handler 910 acknowledges to the protocol stack handler 920 that a suitable RAT has been selected and the inter-RAT measurement has been disabled (Step S1310). After the acknowledgement from the protocol stack handler 910 is received, the protocol stack handler 920 may start to perform the PS data service instructed by the application layer 930 (Step S1312). At the same time, the protocol stack handler 910 may receive messages (e.g. PI or paging messages) and perform measurements to maintain mobility (e.g. the RSSI of BCCH and/or the RSCP and Ec/No of CPICH) with the selected target RAT (Step S1314). Next, the protocol stack handler 920 may detect that the PS data service session has been terminated (Step S1316). After the PS data service session has been terminated, the protocol stack handler 920 may request the protocol stack handler 910 to enable the inter-RAT measurement (Step S1318). Upon receiving the request from the protocol stack handler 920, the protocol stack handler 910 may enable the inter-RAT measurement and perform the inter-RAT cell reselection according to the inter-RAT measurement results (Step S1320).

Figure 14:
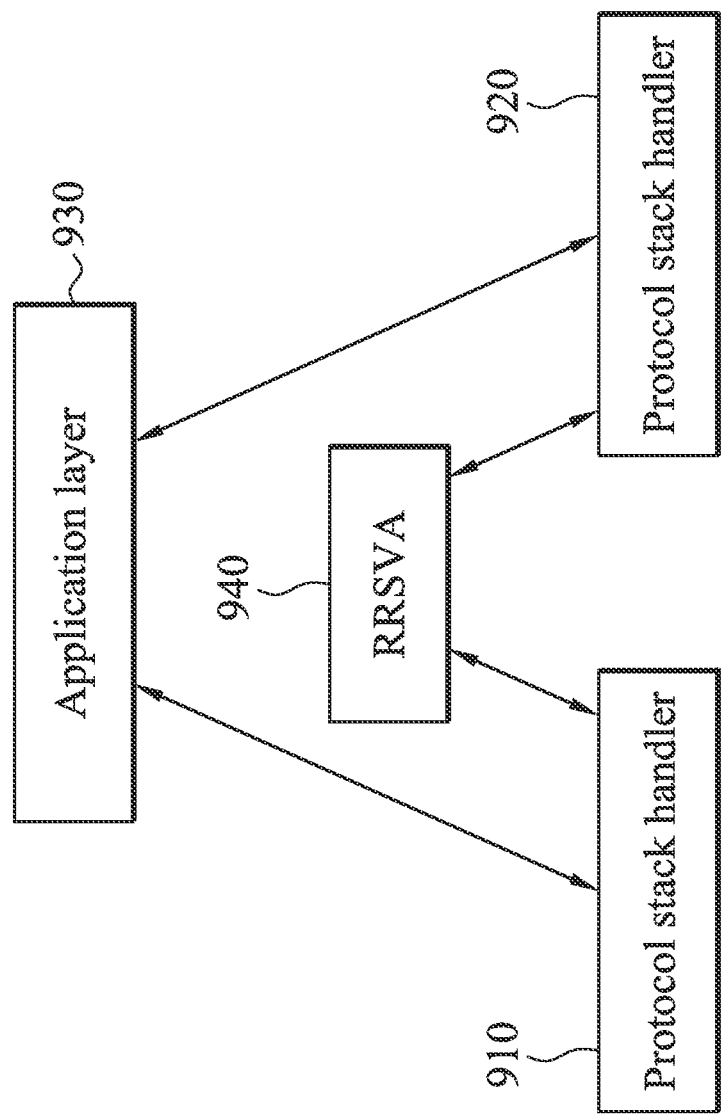
FIG. 14 is a block diagram illustrating the software architecture of an MS according to another embodiment of the invention.

FIG. 14 is a block diagram illustrating the software architecture of an MS according to another embodiment of the invention. Similar to FIG. 8, the exemplary software architecture also contains the protocol stack handlers 910 and 920, and the application layer 930. Additionally, a resource reservation arbitrator (RRSVA) 940 is included, which solves conflicts between the protocol stack handlers 910 and 920 and arbitrates which one of the protocol stack handlers 910 and 920 may occupy the radio resource hardware at a given time. The RRSVA 940 may be implemented in program code and, when the program code is loaded and executed by the processing unit or MCU, granting or rejecting of radio resource requests issued by any of the protocol stack handlers 910 and 920 in terms of predefined rules with the priorities of the requested traffics may be performed. The RRSVA 940 may also be implemented in program code to determine and switch the target service network or the target RAT for an idle subscriber identity card (e.g. the first subscriber identity card) in order to enhance the data rate of the PS data traffic.

Figure 15A:
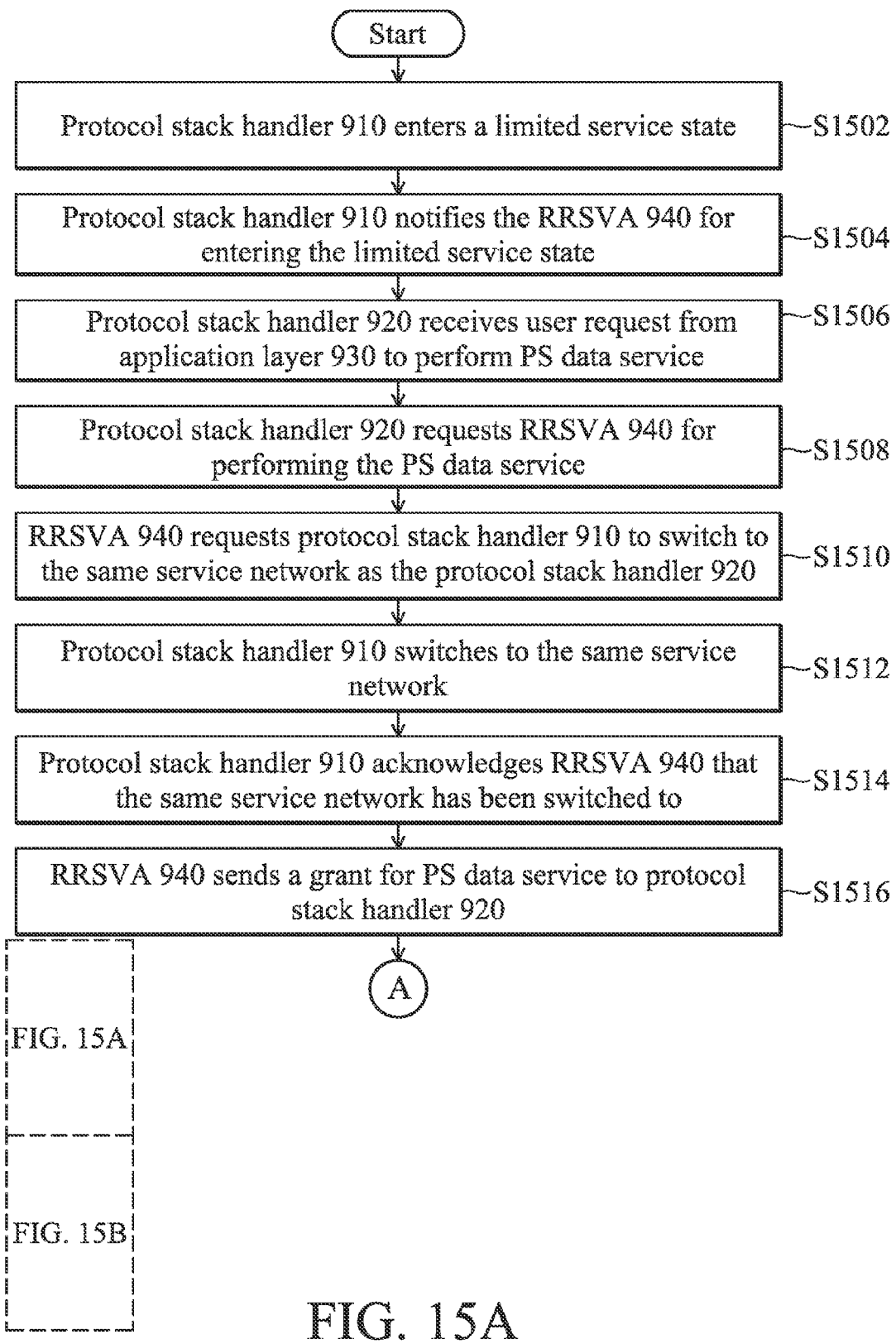
FIG. 15A and FIG. 15B is a flow chart illustrating a method for enhancing the data rate for a packet-switched (PS) data service associated with the second subscriber identity card when the protocol stack handler 910 is in the idle mode by using the software architecture of FIG. 14 according to an embodiment of the invention; and FIG. 16A
Figure 15B:
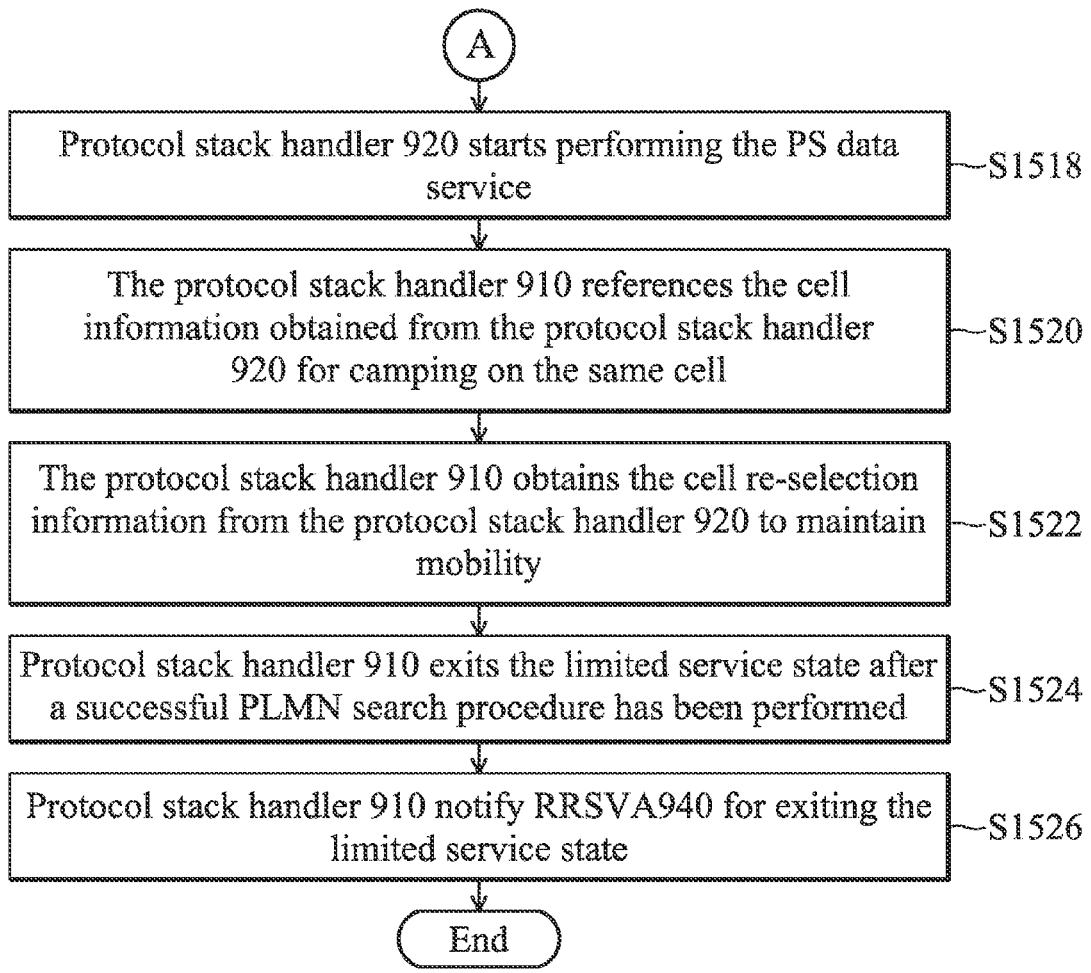

FIG. 15A and FIG. 15B is a flow chart illustrating a method for enhancing the data rate for a packet-switched (PS) data service associated with the second subscriber identity card when the protocol stack handler 910 is in the idle mode by using the software architecture of FIG. 14 according to an embodiment of the invention. The protocol stack handlers 910 is configured to execute operations related to the first subscriber identity card while the protocol stack handlers 920 is configured to execute operations related to the second subscriber identity card. The first subscriber identity card may support one or more RATs (e.g. a SIM card that supports a single GSM/GPRS RAT or a CSIM card that supports both the CDMA RAT and the GSM/GPRS RAT), wherein the second subscriber identity card may support one of the RATs that is supported by the first subscriber identity card (e.g. the UMTS RAT, the CDMA RAT, or the GSM/GPRS RAT). Initially, the protocol stack handlers 910 and 920 are in the idle mode, and the protocol stack handler 910 enters a limited service state in which the protocol stack handler 910 may only attempt to make emergency calls (Step S1502). Upon entering the limited service state, the protocol stack handler 910 may notify the RRSVA 940 for entering the limited service state (Step S1504). In the notification for entering the limited service, the protocol stack handler 910 may include information about the RAT being used. Next, the protocol stack handler 920 receives a user request from the application layer 930 to perform a PS data service such as push e-mail, IM, or others, with an associated service network (e.g. service network 120) (Step S1506). After receiving the user request for performing the PS data service, the protocol stack handler 920 requests the RRSVA 940 to perform the PS data service (Step S1508). In the request for performing the PS data service, the protocol stack handler 920 may include information about the RAT being used and the associated service network. Upon receiving the request from the protocol stack handler 920, the RRSVA 940 may request the protocol stack handler 910 to switch to the same service network (e.g. the service network 120) (step S1510). In this embodiment, the RRSVA 940 may check if the protocol stack handlers 910 and 920 use the same RAT, and request the protocol stack handler 910 to switch to the same service network when the same RAT is used. Next, the protocol stack handler 910 switches to the same service network as the protocol stack handler 920 (Step S1512). Reference for detailed descriptions regarding the operations for switching to the same service network may be made to the aforementioned descriptions relating to FIG. 10.

After switching to the same service network, the protocol stack handler 910 acknowledges the RRSVA 940 that the same service network has been switched to (Step S1514). Upon receiving the acknowledgement, the RRSVA 940 sends a grant for PS data service to the protocol stack handler 920 (Step S1516). The protocol stack handler 920 starts to perform the PS data service after receiving the grant (Step S1518). At the same time, the protocol stack handler 910 may reference the cell information obtained from the protocol stack handler 920, and perform the operations to maintain mobility (e.g. the cell selection/cell re-selection/LAC update procedures) according to the cell information of the protocol stack handler 920 (Step S1520) for camping on the same cell. Taking GSM as example, the cell information may include the frequency, the timing of frame 0 and/or the System Information broadcasted in BCCH. Taking UMTS as example, the cell information may include the system information, the neighbor cell list, the measurement results of serving and neighbor cells, and so on. It is noted that the protocol stack handler 910 consumes less time to instruct the relevant RF module to perform operations camping on the same cell, which have to interrupt PS data transfer for the second subscriber identity card, when obtaining more information from the protocol stack handler 920. That is, more cell information sharing causes less damage to the PS data throughput for the second subscriber identity card. For example, when only obtaining the frequency of the camp-on cell by the protocol stack handler 920, the protocol stack handler 910 instructs the GSM/GPRS RF module to seek timing of the frame 0 at the obtained frequency, obtain System Information from the BCCH, and so on. Contrarily, when obtaining all requisite cell information from the protocol stack handler 920, the protocol stack handler 910 has no need to perform any operation to camp on the same cell as the protocol stack handler 920. Once the user makes an emergency call attempt with the first subscriber identity card, the protocol stack handler 910, for example, can issue a random access channel (RACH) request to the same cell being camped on by the protocol stack handler 920 with reference to the collected cell information. The protocol stack handler 910 may obtain the cell re-selection information from the protocol stack handler 920 to maintain mobility (Step S1522)

While in the limited service state, the protocol stack handler 910 may still perform the periodic PLMN search procedure to recover from the limited service state. Once a successful PLMN search procedure is completed, the protocol stack handler 910 may find out proper cells to camp on and exit the limited service state (Step S1524). After exiting the limited service state, the protocol stack handler 910 may notify the RRSVA 940 when exiting the limited service state (Step S1526). Upon receiving the notification for exiting the limited service state, the RRSVA 940 may notify the application layer 930 that the protocol stack handler 910 has exited the limited service state. Then, the application layer may notify the user of the status related to the first subscriber identity card by showing messages such as "first subscriber identity card in service" or others.

Figure 16A:
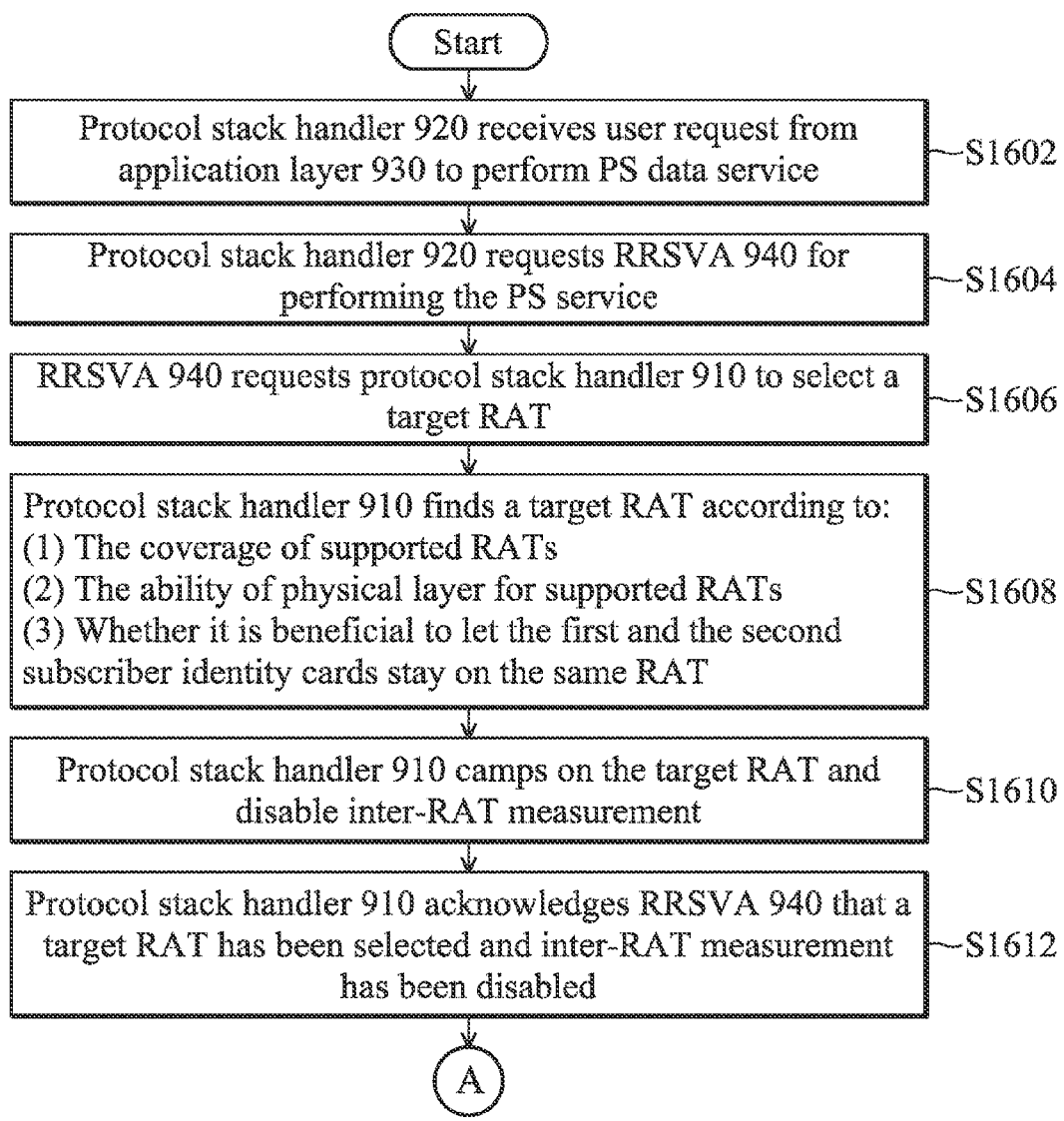
FIG. 16B is a flow chart illustrating a method for enhancing the data rate for a packet-switched (PS) data service associated with the second subscriber identity card when the protocol stack handler 910 is in the idle mode for the first subscriber identity card by using the software architecture of FIG. 14 according to another embodiment of the invention.
Figure 16B:
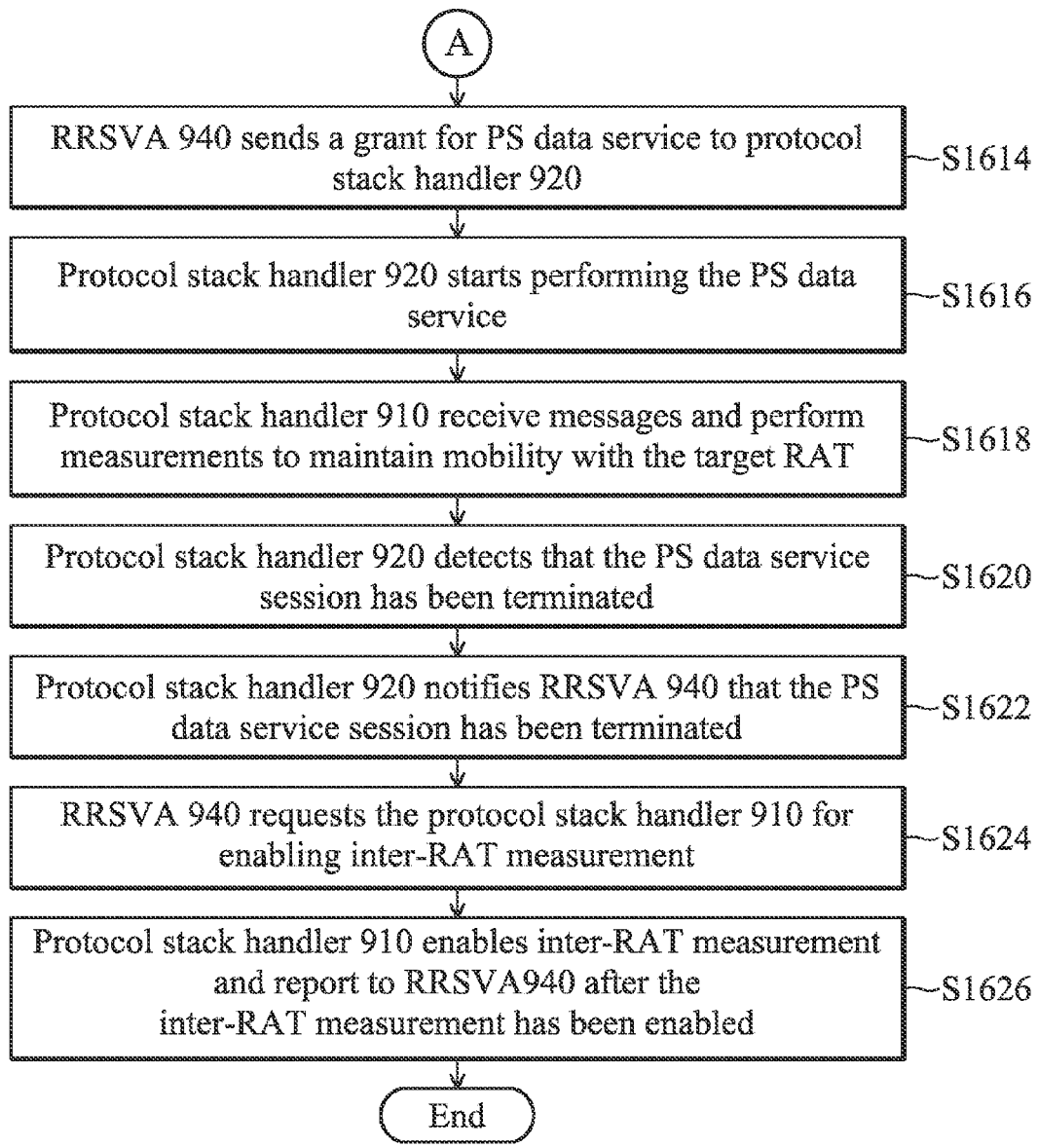

FIG. 16A and FIG. 16B is a flow chart illustrating a method for enhancing the data rate for a packet-switched (PS) data service associated with the second subscriber identity card when the protocol stack handler 910 is in the idle mode for the first subscriber identity card by using the software architecture of FIG. 14 according to another embodiment of the invention. The protocol stack handlers 910 is configured to execute operations related to the first subscriber identity card while the protocol stack handlers 920 is configured to execute operations related to the second subscriber identity card. Specifically, the first subscriber identity card may support more than one RAT (e.g. a CSIM card that supports both the CDMA RAT and the GSM/GPRS RAT). Initially, the protocol stack handlers 910 and 920 are in the idle mode, and the protocol stack handler 920 receives a user request from the application layer 930 to perform a PS data service such as push e-mail, IM, or others using a certain RAT (e.g. the CDMA RAT) (Step S1602). Next, the protocol stack handler 920 requests the RRSVA 940 to perform the PS data service (step S1604). Upon receiving the request, the RRSVA 940 sends a request to the protocol stack handler 910 to select a suitable target RAT (Step S1606), wherein the target RAT is a RAT that may cause the least damage to the PS data rate to the protocol stack handler 920. Specifically, the protocol stack handler 910 may select a target RAT according to but not limited to the aforementioned factors.

Reference for detailed descriptions regarding the methods for acquiring the suitable RAT factors for the supported RATs may be made to the aforementioned descriptions relating to FIG. 12A and FIG. 12B.

After the target RAT has been selected in step S1608, the protocol stack handler 910 further camps on the target RAT and disables the inter-RAT measurement (Step S1610). Reference for detailed descriptions regarding the operations for camping on the target RAT may be made to the aforementioned descriptions. After camping on the target RAT, the protocol stack handler 910 may perform normal circuit switched (CS) or PS operations with the target RAT. In step S1610, the protocol stack handler 910 also disables the inter-RAT measurement, wherein the inter-RAT measurement is the power measurements made to a different RAT supported by the same subscriber identity card (e.g. the first subscriber identity card). By selecting a suitable RAT and disabling the inter-RAT measurement, the protocol stack handler 910 may minimize the time required to receive messages or maintain mobility within the associated service network.

Subsequent to step S1610, the protocol stack handler 910 acknowledges to the RRSVA 940 that a suitable RAT has been selected and the inter-RAT measurement has been disabled (Step S1612). Upon receiving the acknowledgement, the RRSVA 940 may send a grant for PS data service to the protocol stack handler 920, After receiving the grant for PS data service, the protocol stack handler 920 may start to perform the PS data service instructed by the application layer 930 (Step 1616). At the same time, the protocol stack handler 910 may receive messages (e.g. PI or paging messages) and perform measurements to maintain mobility (e.g. the RSSI of BCCH and/or the RSCP and Ec/No of CPICH) with the target RAT (Step S1618). Next, the protocol stack handler 920 may detect that the PS data service session has been terminated (Step 1620). After the PS data service session has been terminated, the protocol stack handler 920 may notify the RRSVA 940 that the PS data service session has been terminated (Step S1622). Upon receiving the notification, the RRSVA 940 may request the protocol stack handler 910 to enable the inter-RAT measurement (Step 1624). After receiving the request from the RRSVA 940, the protocol stack handler 910 may enable the inter-RAT measurement and report to the RRSVA 940 that the inter-RAT measurement has been enabled (Step 1626). Then, the protocol stack handler 910 may perform the inter-RAT cell reselection according to the inter-RAT measurement results.

While the invention has been described by way of example and in terms of preferred embodiment, it is to be understood that the invention is not limited thereto. Those who are skilled in this technology can still make various alterations and modifications without departing from the scope and spirit of this invention. For example, the software architectures of FIGS. 8, 16, and 22 may each be implemented in program code stored in a machine-readable storage medium, such as a magnetic tape, semiconductor, magnetic disk, optical disc (e.g., CD-ROM, DVD-ROM, etc.), or others. A Web server may store the software architectures of FIGS. 8, 16, and 22 in a machine-readable storage medium, which can be downloaded by a client computer through the Internet. When loaded and executed by the processing unit or MCU, the program code may perform the methods of FIG. 12A, 12B, 14, 17, 19, 23 or 24, respectively corresponding to the software architectures of FIGS. 8, 16, and 22. Although the embodiments described above employ the GSM/GPRS, WCDMA and/or UMTS based technologies, the invention is not limited thereto. The embodiments may also be applied to other telecommunication network technologies, such as CDMA 2000, and TD-SCDMA, WiMAX, LTE, and TD-LTE technologies. Therefore, the scope of the present invention shall be defined and protected by the following claims and their equivalents.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A wireless communication device for enhancing a data rate for a packet-switched (PS) data service, comprising:
a processor configured to reference cell information corresponding to a first subscriber identity card to maintain mobility for a second subscriber identity card by using the referenced cell information for camping on a cell when performing the PS data service with a first service network for the first subscriber identity card.

2. The wireless communication device of claim 1, wherein the processor further switches the second subscriber identity card from a second service network to the first service network after a request is received to perform the PS data service with the first subscriber identity card.

3. The wireless communication device of claim 2, wherein the processor further determines whether the first subscriber identity card and the second subscriber identity card support a common radio access technology (RAT), and switches an association of the second subscriber identity card from a second service network to the first service network when the first subscriber identity card and the second subscriber identity card support the common RAT.

4. The wireless communication device of claim 1, wherein the second subscriber identity card is in a limited service state.

5. The wireless communication device of claim 4, wherein the processor further resumes scheduled measurement associated with the second subscriber identity card after the second subscriber identity card exits the limited service state.

6. The wireless communication device of claim 5, wherein the second subscriber identity card exits the limited service state after a corresponding Public Land Mobile Network (PLMN) search procedure has been successfully completed.

7. The wireless communication device of claim 4, wherein the cell information comprises a frequency, timing of a frame 0 or system information broadcasted in a Broadcast Control Channel (BCCH), a serving cell, a neighbor cell list, measurement results of serving and neighbor cells.

8. The wireless communication device of claim 7, wherein the processor maintains the mobility for the second subscriber identity card by using the referenced cell information comprises the steps of:
seeking for the timing of the frame 0 at the frequency of the BCCH;
obtaining the system information from the BCCH;
camping on the serving cell of the first subscriber identity card after the timing of the frame 0 and the system information are acquired; and
using the cell information of the first subscriber identity card to perform an emergency call attempt.

9. A wireless communication device for enhancing a data rate for a packet-switched (PS) data service, comprising:
a processor configured to set an inter-RAT (Radio Access Technology) measurement for a second subscriber identity card into disabled when performing the PS data service with a first subscriber identity card, wherein the inter-RAT measurement is a power measurement made to a different RAT supported by the second subscriber identity card.

10. The wireless communication device of claim 9, wherein the processor further determines a target RAT to stay for the second subscriber identity card according to an effect that the target RAT has on the data rate of the PS data service and directs the second subscriber identity card to camp on the target RAT.

11. The wireless communication device of claim 10, wherein the target RAT is a RAT that causes the least damage to the data rate of the PS data service.

12. The wireless communication device of claim 10, wherein the processor re-determines the target RAT for the second subscriber identity card when the target RAT no longer satisfies a reselection criterion.

13. The wireless communication device of claim 9, wherein the second subscriber identity card supports more than one RAT.

14. The wireless communication device of claim 11, wherein the processor determines and re-determines the target RAT for the second subscriber identity card by considering one of the following: a coverage factor, a physical layer ability factor, and a same RAT factor.

15. The wireless communication device of claim 10, wherein the processor directs the second subscriber identity card to camp on the target RAT by performing the following steps:
selecting a target cell of the target RAT;
camping on the target cell of the target RAT for the second subscriber identity card.

16. A wireless communication method for enhancing a data rate for a packet-switched (PS) data service, comprising:
referencing cell information corresponding to a first subscriber identity card; and
maintaining mobility for a second subscriber identity card by using the referenced cell information for camping on a cell when performing the PS service with the first subscriber identity card.

17. The wireless communication method of claim 16, further comprising:
switching the second subscriber identity card from a second service network to the first service network after receiving a request to perform the PS data service with the first subscriber identity card.

18. The wireless communication method of claim 17, further comprising:
determining whether the first subscriber identity card and the second subscriber identity card support a common radio access technology (RAT); and
switching the second subscriber identity card from a second service network to the first service network when the first subscriber identity card and the second subscriber identity card support the common RAT.

19. The wireless communication method of claim 16, wherein the second subscriber identity card is in a limited service state.

20. The wireless communication method of claim 19, further comprising:
resuming a scheduled measurement associated with the second subscriber identity card after the second subscriber identity card exits the limited service state.

21. The wireless communication method of claim 20, wherein the second subscriber identity card exits the limited service state after a corresponding Public Land Mobile Network (PLMN) search procedure has been successfully completed.

22. The wireless communication method of claim 19, wherein the cell information comprises a frequency, timing of a frame 0 or system information broadcasted in a Broadcast Control Channel (BCCH), a serving cell, a neighbor cell list, measurement results of serving and neighbor cells).

23. The wireless communication method of claim 22, wherein maintaining the mobility for the second subscriber identity card by using the referenced cell information comprises the steps of:
seeking for the timing of the frame 0 at the frequency of the BCCH;
obtaining the system information from the BCCH;
camping on the serving cell of the first subscriber identity card directly after the timing of the frame 0 and the system information are acquired; and
using the cell information of the first subscriber identity card to perform an emergency call attempt.

24. A wireless communication method for enhancing a data rate for a packet-switched (PS) data service, comprising:
setting an inter-RAT (Radio Access Technology) measurement of the second subscriber identity card into disabled when performing the PS data service with a first subscriber identity card, wherein the inter-RAT measurement is a power measurement made to a different RAT supported by the second subscriber identity card.

25. The wireless communication method of claim 24, further comprising:
determining a target RAT to stay for the second subscriber identity card according to an effect that the target RAT has on the data rate of the PS data service and directs the second subscriber identity card to camp on the target RAT.

26. The wireless communication method of claim 25, wherein the target RAT is a RAT that causes the least damage to the data rate of the PS data service.

27. The wireless communication method of claim 25 further comprising:
re-determining the target RAT for the second subscriber identity card when the target RAT no longer satisfies a reselection criterion.

28. The wireless communication method of claim 24, wherein the second subscriber identity card supports more than one RAT.

29. The wireless communication method of claim 28 further comprising:
determining and re-determining the target RAT for the second subscriber identity card by considering one of the following: a coverage factor, a physical layer ability factor, and a same RAT factor.

30. The wireless communication method of claim 25, wherein directing the second subscriber identity card to camp on the target RAT further comprises:
selecting a target cell of the target RAT;
camping on the target cell of the target RAT for the second subscriber identity card.

* * * * *